(12) United States Patent
Ikeda et al.

(10) Patent No.: US 7,871,733 B2
(45) Date of Patent: Jan. 18, 2011

(54) FUEL CELLS HAVING A WATER GUIDE ELEMENT

(75) Inventors: Kotaro Ikeda, Susono (JP); Masaki Ando, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 514 days.

(21) Appl. No.: 11/948,300

(22) Filed: Nov. 30, 2007

(65) Prior Publication Data

US 2008/0131745 A1 Jun. 5, 2008

(30) Foreign Application Priority Data

Dec. 4, 2006 (JP) ............................. 2006-327056
Nov. 16, 2007 (JP) ............................. 2007-298449

(51) Int. Cl.
*H01M 2/38* (2006.01)
(52) U.S. Cl. ..................... 429/455; 429/456; 429/457; 429/514
(58) Field of Classification Search ................. 429/34, 429/38, 39, 35, 26, 22
See application file for complete search history.

(56) References Cited

U.S. PATENT DOCUMENTS

2004/0115500 A1* 6/2004 Ogami et al. ................. 429/32

2005/0112353 A1* 5/2005 Harada et al. ............ 428/304.4

FOREIGN PATENT DOCUMENTS

| JP | 6-124717 | 5/1994 |
|---|---|---|
| JP | 2004-31325 | 1/2004 |
| JP | 2005-141979 | 6/2005 |
| JP | 2006-4920 | 1/2006 |
| JP | 2006-100155 | 4/2006 |
| WO | WO 99/56335 | 11/1999 |

* cited by examiner

*Primary Examiner*—Raymond Alejandro
(74) *Attorney, Agent, or Firm*—Oblon, Spivak, McClelland, Maier & Neustadt, L.L.P.

(57) ABSTRACT

In a fuel cell structure having an assembly of an electrolyte layer and an electrode formed on the electrolyte layer, a gas separator 25 is laminated on the electrolyte layer and the electrode and forms, in combination with the electrode, a gas flow path to make a flow of a reactive gas that is subjected to an electrochemical reaction. A first water guide element is provided between the electrode and the gas separator 25 and is arranged to enable migration of water from and to the electrode and to continuously guide water in an electrode plane direction. A gas outlet 68 is open at one end of the gas flow path to be at least partly overlapped with one end of the first water guide element and discharges the flow of the reactive gas from the gas flow path. The gas outlet 68 is designed to have a higher flow resistance of the reactive gas than a flow resistance in the gas flow path. This arrangement effectively improves the water discharge efficiency from the gas flow path formed in the fuel cell structure.

25 Claims, 20 Drawing Sheets

FUEL CELLS HAVING A WATER GUIDE ELEMENT

FIELD OF THE TECHNOLOGY

The present invention relates to fuel cells.

DESCRIPTION OF THE RELATED ART

In the progress of an electrochemical reaction in a fuel cell, water is produced on one electrode. Especially in polymer electrolyte fuel cells, a gas supplied to the fuel cell may be humidified since an electrolyte membrane is to be kept in the wet state. In this structure, the water content in the gas may be condensed in a gas flow path. In the fuel cell structure having the possibility of condensation of water in the gas flow path, smooth passage of the gas supplied to and discharged from the electrode and discharge passage of liquid water produced on the electrode are demanded to prevent deterioration of the cell performance due to the interference of liquid water with the supply and discharge of the gas to and from the electrode. One proposed structure for ensuring the gas flow passage and the water discharge passage provides a porous support layer that is located close to the electrode and has both hydrophobic pores and hydrophilic pores. The hydrophobic pores ensure the gas flow passage, while the hydrophilic pores ensure the liquid water passage.

This porous structure with the hydrophobic pores and the hydrophilic pores for ensuring the gas flow passage and the liquid water passage, however, has limitation of the water discharge efficiency. The water discharge efficiency may not be sufficient according to the operation state of the fuel cell. For example, with a decrease in internal temperature of the fuel cell, the saturated vapor pressure is lowered to make the gas supplied to the electrode in an excessively humid state. In this case, the hydrophilic pores for the liquid water passage may not ensure the sufficient water discharge. Accumulation of water inside the fuel cell may cause a partially insufficient gas supply and gradually lower the cell performance. A further improvement of the water discharge efficiency is thus required in the fuel cell structure for the stable cell performance.

SUMMARY OF THE INVENTION

There would thus be a demand for improving the water discharge efficiency from a gas flow path provided in a fuel cell.

One aspect of the invention pertains to a fuel cell, including: an electrolyte layer; an electrode formed on the electrolyte layer; a gas separator that is laminated on the electrolyte layer and the electrode and forms, in combination with the electrode, a gas flow path to make a flow of a reactive gas that is subjected to an electrochemical reaction; a first water guide element that is provided between the electrode and the gas separator and is arranged to enable migration of water from and to the electrode and to guide water in an electrode plane direction; and a gas outlet that is open at one end of the gas flow path to be at least partly overlapped with one end of the first water guide element and discharges the flow of the reactive gas from the gas flow path, where the gas outlet is designed to have a higher flow resistance of the reactive gas than a flow resistance inside the gas flow path.

In the fuel cell according to one aspect of the invention, the gas outlet open to be at least partly overlapped with the end of the first water guide element is designed to have the higher flow resistance of the reactive gas than the flow resistance inside the gas flow path. The reactive gas accordingly has a higher flow rate in the vicinity of the gas outlet. Since the water migrated from the electrode is guided in the electrode plane direction by the first water guide element, the water is continuously dischargeable on the flow of the reactive gas from the first water guide element. This arrangement thus effectively prevents the occurrence of a potential trouble caused by accumulation of water in the gas flow path provided in the fuel cell.

In one preferable structure of the fuel cell according to one aspect of the invention, the electrode formed on the electrolyte layer has a gas diffusion layer that is made of a porous material to enhance dispersibility of the reactive gas supplied to the electrode. In the fuel cell of this structure, the gas diffusion layer may be treated by a water repellent process, while the first water guide element may be treated by a hydrophilic process.

In the fuel cell according to the above aspect of the invention, the first water guide element may be arranged to cover over a whole surface of the electrode. The first water guide element arranged to cover over the whole area of the electrode guides the water migrated from the electrode in the electrode plane direction. This arrangement enhances the water discharge efficiency.

In one preferable embodiment of the fuel cell according to the above aspect of the invention, the first water guide element includes a first porous body having pores continuously spread at least in the electrode plane direction to enable inflow of the reactive gas from the gas flow path. In the fuel cell of this embodiment, the water migrated from the electrode to the first porous body functioning as the first water guide element is guided continuously in the electrode plane direction via the pores formed in the first porous body. The higher flow path resistance in the vicinity of the gas outlet increases the flow rate of the reactive gas and accelerates the inflow of the reactive gas into the first porous body. This arrangement thus ensures the efficient continuous water discharge from the first porous body by utilizing the flow of the reactive gas.

In one preferable structure of the fuel cell of this embodiment, the end of the gas flow path with the gas outlet is blocked, and the gas outlet is formed at one end of the first porous body. In this structure, the reactive gas to be discharged from the gas outlet fully flows into the first porous body in the vicinity of the end of the first porous body and is discharged from the end of the first porous body. This arrangement ensures the efficient water discharge from the first porous body by utilizing the flow of the reactive gas.

In the fuel cell of this structure, the end of the first porous body with the gas outlet may have a partly blocked cross section. The partial blockage further increases the flow resistance of the reactive gas at the gas outlet of the gas flow path. This increases the flow rate of the reactive gas and enhances the water discharge efficiency from the first water guide element by utilizing the flow of the reactive gas.

In another preferable structure of the fuel cell of the above embodiment, the gas outlet is open to part of a cross section of the gas flow path, in addition to the end of the first porous body. In this structure, the reactive gas to be discharged from the gas outlet partly flows into the first porous body in the vicinity of the end of the first porous body. This arrangement enables continuous water discharge from the first porous body by utilizing the flow of the reactive gas flowing into the first porous body.

In one preferable application of the fuel cell of the above embodiment, the first porous body is designed to have a smaller average pore diameter in an area close to the gas outlet than an average pore diameter in a residual area. In the fuel cell of this application, the flow resistance of the reactive gas passing through the pores formed in the first porous body is increased in the vicinity of the gas outlet. The increased flow resistance enhances the water pulling force of the reactive gas from the first porous body. This arrangement thus improves the water discharge efficiency from the first porous body.

In an alternative preferable application of the fuel cell of the above embodiment, the first porous body is designed to have a greater average pore diameter in an area close to the gas outlet than an average pore diameter in a residual area. In the fuel cell of this application, the flow resistance of the reactive gas passing through the pores formed in the first porous body is decreased in the vicinity of the gas outlet. The decreased flow resistance reduces the water pulling force of the reactive gas from the first porous body. This arrangement thus prevents the inside of the fuel cell from falling into the state of insufficient water content due to the excess water discharge from the first porous body.

In another preferable application of the fuel cell of the above embodiment, the first porous body is designed to have a higher hydrophilicity in an area close to the gas outlet than a hydrophilicity in a residual area. In the fuel cell of this application, the water retention power is increased in the vicinity of the gas outlet to encourage migration of the water to the vicinity of the gas outlet in the first porous body. This arrangement facilitates the water discharge from the vicinity of the gas outlet and thus enhances the water discharge efficiency from the first porous body.

In an alternative preferable application of the fuel cell of the above embodiment, the first porous body is designed to have a lower hydrophilicity in an area close to the gas outlet than a hydrophilicity in a residual area. In the fuel cell of this application, the water retention power is relatively decreased in the vicinity of the gas outlet to discourage migration of the water to the vicinity of the gas outlet in the first porous body. This arrangement restricts the water discharge from the vicinity of the gas outlet and thus prevents the inside of the fuel cell from falling into the state of insufficient water content due to the excess water discharge from the first porous body.

In one preferable structure of the fuel cell of the above embodiment, the pores formed in the first porous body are spread continuously in a laminating direction as well as in the electrode plane direction. The first porous body is provided to be in contact with the electrode and to cover over a whole surface of the electrode. The gas flow path is formed between the first porous body and the separator. In the fuel cell of this structure, the whole area of the electrode is covered with the first porous body. This arrangement enables the water produced at any location on the electrode to be promptly migrated into the first porous body and thus ensures the efficient continuous water discharge.

In one example of the fuel cell of this structure, one of the first porous body and the separator has multiple projections that are brought into contact with an opposed face of the other of the separator and the first porous body. The gas flow path includes a space defined by the multiple projections.

The fuel cell structure of this example effectively lowers the total pressure loss in the gas flow path, compared with a conventional design of the gas flow path fully formed by the pores of a porous body that is equivalent to the first porous body. The lower pressure loss reduces a loss in auxiliary machinery for the supply of the reactive gas (for example, power consumption of a supplier for supplying the reactive gas) and thereby prevents a decrease in total energy efficiency of a fuel cell system.

In another preferable structure of the fuel cell of the above embodiment, the first porous body is located on one plane of the separator for forming the gas flow path, and the gas flow path is formed between the electrode and the first porous body. The fuel cell of this structure further has a second water guide element that connects the electrode with the first porous body, such as to enable migration of water between the electrode and the first porous body. In the fuel cell of this structure, the water is migrated from the electrode into the first porous body via the second water guide element and is continuously discharged from the first porous body in the vicinity of the gas outlet.

In one example of the fuel cell of this structure, the first porous body has multiple projections that are in contact with an opposed face of the electrode. The gas flow path includes a space defined by the multiple projections. The multiple projections work as the second water guide element.

In the fuel cell structure of this example, the water is migrated from the electrode into the first porous body by means of the multiple projections formed as the second water guide element on the first porous body and is continuously discharged from the first porous body in the vicinity of the gas outlet. The fuel cell structure of this example effectively lowers the total pressure loss in the gas flow path, compared with the conventional design of the gas flow path fully formed by the pores of a porous body that is equivalent to the first porous body. The lower pressure loss reduces a loss in auxiliary machinery and thereby prevents a decrease in total energy efficiency of a fuel cell system.

In another example, the fuel cell of the above structure further has a second porous body that is provided to be in contact with the electrode and cover over a whole surface of the electrode. The gas flow path is formed between the first porous body and the second porous body. The second water guide element is arranged to enable migration of water between the first porous body and the second porous body. In the fuel cell structure of this example, the water produced on the electrode is promptly absorbed by the second porous body. This restricts the interference of liquid water with diffusion of the reactive gas to the electrode and thereby enhances the utilization efficiency of the reactive gas. Part of the water absorbed by the second porous body is migrated into the first porous body. This restricts the interference of the water content in the second porous body with diffusion of the reactive gas to the electrode and enhances the utilization efficiency of the reactive gas, thus improving the cell performance.

In the fuel cell structure of this example, the second porous body may have a lower thickness than the first porous body. The first porous body accordingly has a higher water retention power and allows a greater amount of water to be migrated from the second porous body to the first porous body. This arrangement effectively restricts the interference of the liquid water content in the second porous body with diffusion of the reactive gas to the electrode.

In the fuel cell structure of this example, the second porous body may have a greater average pore diameter than the first porous body. The first porous body accordingly has a higher water retention power and allows a greater amount of water to be migrated from the second porous body to the first porous body. This arrangement effectively restricts the interference of the liquid water content in the second porous body with diffusion of the reactive gas to the electrode.

In one preferable structure of the fuel cell of the above embodiment, the first porous body has a base porous material that is subjected to surface treatment to have a contact angle of or below a contact angle of gold.

Such surface treatment increases the hydrophilicity on the surface of the first porous body. The water migrated from the electrode does not locally accumulate but is continuously guided along the surface of the pores formed in the first porous body toward the gas outlet. The migration of the water along the surface of the pores effectively prevents blockage of the pores by the water and ensures the flow of the reactive gas through the space defined by the pores. This arrangement effectively prevents deterioration of the cell performance due to accumulation of the liquid water.

In one preferable embodiment of the fuel cell according to one aspect of the invention, the first water guide element has multiple grooves formed on one face of the separator for forming the gas flow path, and the gas outlet is formed to be continuous with the first water guide element and is open to part of a cross section of the gas flow path. The fuel cell of this embodiment further has a second water guide element that connects the electrode with the first water guide element, such as to enable migration of water between the electrode and the first water guide element.

In the fuel cell of this embodiment, the water is migrated from the electrode to the multiple grooves functioning as the first water guide element by means of the second water guide element and is continuously guided in the electrode plane direction along the multiple grooves. The gas outlet is open to part of the cross section of the gas flow path. This heightens the flow resistance of the reactive gas in the vicinity of the gas outlet and increases the flow rate of the reactive gas. The reactive gas at the increased flow rate in the vicinity of the gas outlet flows along the surface of the multiple grooves and enables continuous water discharge from the multiple grooves.

In the fuel cell according to one aspect of the invention, it is preferable that the gas outlet has a water-absorbing material that is provided in part of an open wall surface and absorbs water to be swollen and releases water to be contracted. In the environment of increased water content in the vicinity of the gas outlet, the water-absorbing material absorbs water to be swollen and narrows the opening area of the gas outlet. The narrowed gas outlet heightens the flow path resistance at the gas outlet and increases the flow rate of the reactive gas, thus increasing the amount of water discharged from the first water guide element by means of the flow of the reactive gas. In the environment of decreased water content in the vicinity of the gas outlet, on the contrary, the water-absorbing material releases water to be contracted and widens the opening area of the gas outlet. The widened gas outlet lowers the flow path resistance at the gas outlet and decreases the flow rate of the reactive gas, thus decreasing the amount of water discharged from the first water guide element by means of the flow of the reactive gas.

In another preferable embodiment of the fuel cell according to one aspect of the invention, the gas outlet has a specific area that is open at the end of the first water guide element and a residual area covered with a second porous body, which is arranged to enable migration of water to and from the first water guide element. In the fuel cell of this embodiment, since the reactive gas flows through the inside of the second porous body prior to the outflow from the gas outlet, water is discharged from the second porous body in addition to the end of the first water guide element.

In one preferable structure of the fuel cell of this embodiment, the first water guide element includes a first porous body having pores continuously spread at least in the electrode plane direction to enable inflow of the reactive gas from the gas flow path. The first porous body and the second porous body have different average pore diameters. The reactive gas to be discharged from the gas outlet goes through an area having the lower flow path resistance, that is, the inside of the porous body having the smaller average pore diameter. This increases the flow rate of the discharged reactive gas and enhances the water discharge power by utilizing the flow of the reactive gas, thus improving the water discharge efficiency.

In another preferable structure of the fuel cell of this embodiment, the second porous body includes plural divisional sections having different average pore diameters. The reactive gas passing through the second porous body prior to discharge from the gas outlet goes through an area having the lower flow path resistance, that is, a divisional section of the second porous body having the smaller average pore diameter. This increases the flow rate of the discharged reactive gas and enhances the water discharge power by utilizing the flow of the reactive gas, thus improving the water discharge efficiency.

In one preferable embodiment according to one aspect of the invention, the fuel cell further has a third porous body that is provided at one end of the first water guide element to enable migration of water to and from the first water guide element and is arranged to cover over at least part of a gas inlet for inflow of the reactive gas into the gas flow path. In the fuel cell of this embodiment, the water moving from the electrode to the first water guide element further migrates into the third porous body. The water migrated in the third porous body humidifies the reactive gas that passes through the third porous body and is flowed into the gas flow path.

Another aspect of the invention pertains to a fuel cell, including: an electrolyte layer; an electrode formed on the electrolyte layer; a gas separator this is laminated on the electrolyte layer and the electrode and forms, in combination with the electrode, a gas flow path to make a flow of a reactive gas that is subjected to an electrochemical reaction; a first water guide element that is provided between the electrode and the gas separator and is arranged to enable migration of water from and to the electrode and to guide water in an electrode plane direction according to a variation in amount of water retention in the electrode plane direction; and a gas outlet that is provided at one end of the gas flow path to guide the reactive gas toward the first water guide element, where at least part of a wall surface of the gas flow path forms the first water guide element.

In the fuel cell according to this aspect of the invention, at least part of the wall surface of the gas flow path forms the first water guide element at the end of the gas flow path with the gas outlet. The first water guide element guides the water in the electrode plane direction according to the variation in amount of water retention in the electrode plane direction. This arrangement desirably enhances the water discharge efficiency from the gas flow path provided in the fuel cell.

Still another aspect of the invention is directed to a fuel cell system including: the fuel cell of any of the above structures that additionally has a gas inlet that introduces a flow of the reactive gas into the gas flow path and is designed to have a lower flow resistance of the reactive gas than a flow resistance in the gas outlet; a gas supplier that feeds a supply of the reactive gas to the fuel cell; a first piping that connects the gas supplier to the fuel cell; a second piping that is connected with the fuel cell and makes a flow of the reactive gas discharged from the fuel cell; a dry operation state detector that detects whether inside of the fuel cell is in a state of insufficient water content; and a flow path changeover switch that, in response to detection of the state of insufficient water content by the dry operation state detector, connects the gas supplier to the second piping instead of the first piping and thereby changes over a connection status of the first piping and the second piping so as to reverse a flow direction of the reactive gas inside the fuel cell.

In the fuel cell system according to this aspect of the invention, the changeover of the flow direction of the reactive gas according to the moisture status inside the fuel cell attains adequate control of the water content in the fuel cell. In the environment of the excess water content inside the fuel cell, the reactive gas is flowed in the same direction as the flow direction in the fuel cell described above to encourage the water discharge from the gas flow path. Such control effectively prevents deterioration of the cell performance due to the presence of excess liquid water. In the environment of the insufficient water content inside the fuel cell, on the contrary, the reactive gas is flowed in the reverse direction opposite to the flow direction in the fuel cell described above. The gas inlet having the lower flow resistance is then changed to the gas outlet in the fuel cell structure. Such control lowers the flow resistance of the reactive gas discharged from the gas flow path and accordingly discourages the water discharge from the gas flow path. This prevents the moisture status of the insufficient water content inside the fuel cell.

The technique of the invention is not restricted to the fuel cell or the fuel cell system having the configurations described above, but is actualized by diversity of other applications, for example, a water discharge method of discharging water from a gas flow path provided in a fuel cell.

DESCRIPTION OF THE PREFERRED EMBODIMENTS

A. General Structure of Fuel Cell

Figure 1:
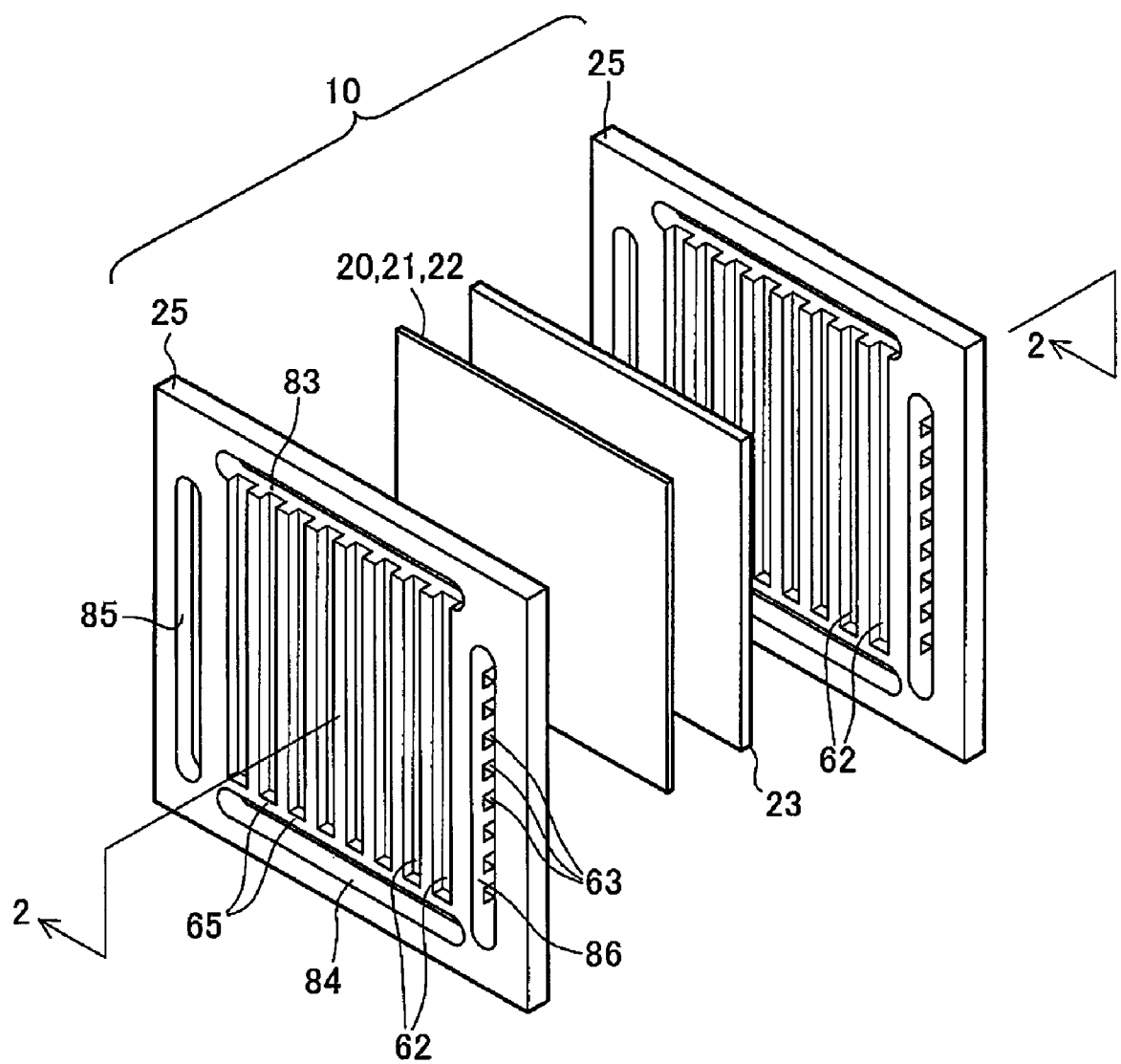
FIG. 1 is a decomposed perspective view illustrating the schematic structure of a fuel cell in a first embodiment.
Figure 2:
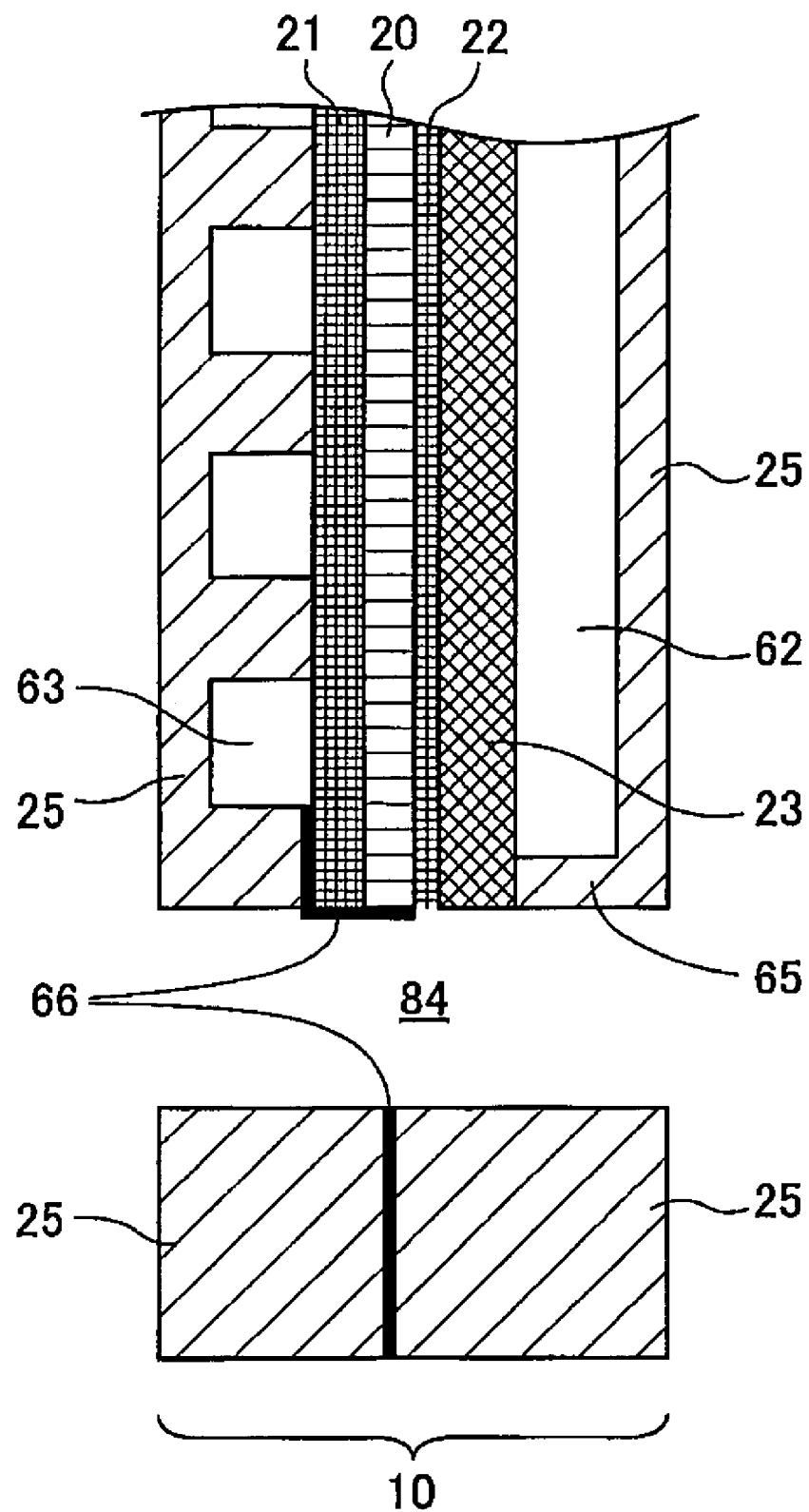
FIG. 2 is a sectional view schematically showing the fuel cell, taken on a line 2-2 in FIG. 1.

FIG. 1 is a decomposed perspective view illustrating the schematic structure of a fuel cell in a first embodiment of the invention. FIG. 2 is a sectional view schematically showing the fuel cell, taken on a line 2-2 in FIG. 1. In the first embodiment, multiple fuel cells as unit cells are laminated to form a stack structure. FIGS. 1 and 2 show the structure of a unit cell 10 as the unit of the fuel cell stack.

The fuel cell of the embodiment is a polymer electrolyte fuel cell. The unit cell 10 has a membrane-electrode assembly (hereafter referred to as MEA) 20 constructed from an electrolyte membrane and an anode and a cathode as electrodes formed on opposed faces of the electrolyte membrane. Gas diffusion layers 21 and 22 are provided respectively on the anode and the cathode (see FIG. 2). A flow path-forming porous layer 23 is further provided above the gas diffusion layer 22 on the cathode side. The laminate of the MEA 20, the gas diffusion layers 21 and 22, and the flow path-forming porous layer 23 is located between a pair of gas separators 25.

The electrolyte membrane is a proton-conductive ion exchange membrane that is made of a solid polymer electrolyte, for example, a fluororesin, and shows high electric conductivity in the wet state.

Each of the anode and the cathode is formed by making a catalyst, for example, platinum or a platinum alloy, carried on an electrically conductive carrier. A concrete procedure of forming the anode and the cathode prepares a paste of electrode material mixture containing carbon particles with the catalyst carried thereon and an electrolyte identical with the polymer electrolyte of the electrolyte membrane, applies the electrode paste on the opposed faces of the electrolyte membrane or on the gas diffusion layers 21 and 22, and dries the applied electrode paste for fixation.

The gas diffusion layers 21 and 22 are made of a gas-permeable electrically conductive material, for example, carbon paper or carbon cloth. The gas diffusion layers 21 and 22 of this embodiment are substantially flat thin plate members. The gas diffusion layers generally form flow paths for gases subjected to an electrochemical reaction and are designed to enhance the diffusion of the gases subjected to the electrochemical reaction. The gas diffusion layers also function as current collectors. The gas diffusion layers 21 and 22 of this embodiment are treated to have water repellency. Fine particles of a water repellent material, for example, polytetrafluoroethylene (PTFE), are sprayed or otherwise applied on the surface of the electrically conductive material. In the structure of the embodiment, the gas diffusion layer 22 on the cathode side is formed thinner than the gas diffusion layer 21 on the anode side.

The flow path-forming porous layer 23 is made of a gas-permeable electrically conductive material and is formed from gold-plated titanium foam in this embodiment. The electrically conductive material of the flow path-forming porous layer 23 has a greater average pore diameter and a less pressure loss in gas permeation than those of the electrically conductive material of the gas diffusion layers 21 and 22. The flow path-forming porous layer 23 has a large number of pores formed inside to mutually communicate in the direction of its plane and in the direction of its depth. The space defined by these pores forms a flow path for an oxidizing gas to be supplied to the cathode.

Each of the gas separators 25 is made of a gas-impermeable electrically conductive material, for example, gold-plated titanium, gas-impermeable dense carbon obtained by compaction of carbon powder, or fired carbon. The gas separator 25 forms, in combination with the MEA 20, a gas flow path for a reactive gas (a hydrogen-containing fuel gas or an oxygen-containing oxidizing gas). The surface of the gas separator 25 has the concave-convex structure for formation of the gas flow path. More specifically, either face of the gas separator 25 has grooves 62 or grooves 63 formed as multiple linear concaves arranged substantially in parallel to one another. In the unit cell 10, one face of the gas separator 25 with the grooves 62 formed thereon and one face of the MEA 20 facing the flow path-forming porous layer 23 define an inner-unit cell oxidizing gas flow path for the flow of the oxidizing gas (see FIG. 2). The other face of the gas separator 25 with the grooves 63 formed thereon and the other face of the MEA 20 define an inner-unit cell fuel gas flow path for the flow of the fuel gas (see FIG. 2). In the structure of this embodiment, the inner-unit cell oxidizing gas flow path formed by the grooves 62 is arranged perpendicular to the inner-unit cell fuel gas flow path formed by the grooves 63. This arrangement is, however, not restrictive. The inner-unit cell oxidizing gas flow path and the inner-unit cell fuel gas flow path may be formed in parallel to each other. The flow of the oxidizing gas may be opposed to the flow of the fuel gas.

The gas separator 25 has slots 83 through 86 arranged at corresponding positions on the respective sides of its outer circumference. In assembly of the fuel cell stack by lamination of the gas separators 25, the MEAs 20, the gas diffusion layers 21 and 22, and the flow path-forming porous layers 23, the slots 83 through 86 formed at the corresponding positions on the respective gas separator 25 respectively overlap to form supply and exhaust flow paths as gas manifolds that go through the fuel cell stack in a laminating direction of the gas separators 25. The reactive gases are supplied and discharged through these gas manifolds to and from the respective inner-unit cell gas flow paths. The slots 83 communicating with the grooves 62 form an oxidizing gas supply manifold for distributing the supply of the oxidizing gas into the respective inner-unit cell oxidizing gas flow paths. The slots 84 form an oxidizing gas exhaust manifold for collecting the respective flows of a cathode exhaust gas discharged from the respective inner-unit cell oxidizing gas flow paths. The slots 85 and the slots 86 communicating with the grooves 63 respectively form a fuel gas supply manifold and a fuel gas exhaust manifold.

The grooves 63 formed on the side face of the gas separator 25 facing the anode are designed to connect the slot 85 with the slot 86. The grooves 62 formed on the side face of the gas separator 25 facing the cathode are, on the other hand, designed to communicate with the slot 83 on one end but to be dead-ended on the other end and have no communication with the slot 84. An area located between the end of the grooves 62 and the slot 84 on the side face of the gas separator 25 facing the cathode is hereafter referred to as a flow path blockage area 65.

The MEA 20, the gas diffusion layers 21 and 22, and the flow path-forming porous layer 23 are provided to cover the whole inner-unit cell gas flow paths formed by the grooves 62 and 63 and the flow path blockage area 65 (see FIG. 2).

A seal layer 66 made of an adhesive is formed around the MEA 20 to ensure the sufficient sealing property from the gas separator 25 (see FIG. 2). Namely the seal layer 66 is provided on the outer circumference of the MEA 20 except areas communicating with the respective inner-unit cell gas flow paths and the respective gas manifolds. The seal layer 66 effectively prevents a gas leakage (crossover) between the inner-unit cell fuel gas flow path and the inner-unit cell oxidizing gas flow path via the periphery of the electrolyte membrane, as well as a leakage of the fuel gas or the oxidizing gas to the outside of the unit cell 10. The seal layer 66 is similarly provided around the respective slots 83 through 86. This ensures the sufficient sealing property between each pair of the adjacent gas separators 25. The structure of ensuring the gas sealing property is not restricted to the seal layer 66 of the adhesive, but another suitable structure like a gasket may replace the seal layer 66.

In the fuel cell stack, a cooling medium flow path may be provided between each pair of the adjacent unit cells 10 or at every lamination of a predetermined number of unit cells 10.

B. Water Discharge by Gas Flow

Figure 3:
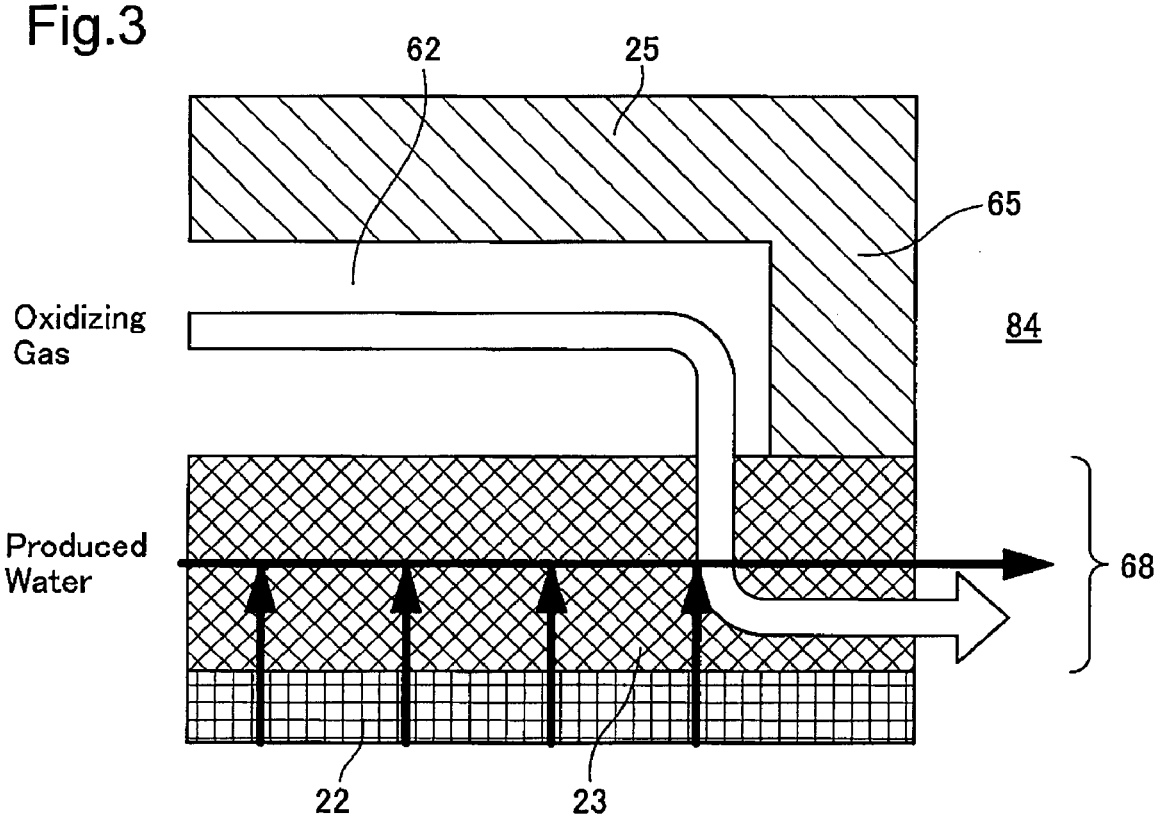
FIG. 3 is a sectional view schematically showing the flows of an oxidizing gas and water.

FIG. 3 is a sectional view schematically showing the flows of the oxidizing gas and water at one end of the inner-unit cell oxidizing gas flow path. As mentioned above, the oxidizing gas flows through the oxidizing gas supply manifold formed by the slots 83 is distributed into each inner-unit cell oxidizing gas flow path defined by the grooves 62 and the flow path-forming porous layer 23. The space formed by the grooves 62 has the lower gas flow resistance than the space formed by the pores in the flow path-forming porous layer 23. The oxidizing gas distributed into the inner-unit cell oxidizing gas flow path thus mainly flows in the space formed by the grooves 62. The pores in the flow path-forming porous layer 23 are continuously formed in the direction of its depth as well as in the direction of its plane. The oxidizing gas flowing through the inner-unit cell oxidizing gas flow path accordingly goes through the flow path-forming porous layer 23 in the direction of its depth and is supplied to the cathode on the electrolyte membrane via the gas diffusion layer 22.

The gas separator 25 has the flow path blockage area 65 in the vicinity of the slot 84. Namely the grooves 62 are dead-ended in the vicinity of the slot 84. The oxidizing gas flowing through the space formed by the grooves 62 is thus flowed into the flow path-forming porous layer 23 at the dead end of the grooves 62. The oxidizing gas flowing through the inner-unit cell oxidizing gas flow path is all flowed through a gas outlet 68 open at one end of the flow path-forming porous layer 23 and is discharged into the oxidizing gas exhaust manifold formed by the slots 84. An open arrow in FIG. 3 represents the flow of the oxidizing gas that flows through the space formed by the grooves 62 and is discharged from the gas outlet 68. The gas outlet 68 at least partially overlaps with the end of the flow path-forming porous layer 23 in the laminated direction. In other word, the gas outlet 68 has an opening in which the end of the flow path-forming porous layer 23 is positioned.

In power generation of the fuel cell stack with the flow of the oxidizing gas through the respective inner-unit cell oxidizing gas flow paths, water is produced on the cathodes with progress of the electrochemical reaction. The gas diffusion layer 22 is treated to have water repellency as mentioned above. The water-repellent gas diffusion layer 22 presses back part of the produced water on the cathode toward the electrolyte membrane to keep the electrolyte membrane in the wet state. The remaining part of the produced water is repelled toward the flow path-forming porous layer 23. The flow path-forming porous layer 23 is made of the gold-plated titanium foam in this embodiment as mentioned above. The gold plating increases the hydrophilicity of the titanium foam surface. The produced water repelled toward the flow path-forming porous layer 23 accordingly has the affinity for the surface of the flow path-forming porous layer 23 and is spread over in the flow path-forming porous layer 23. In power generation of the fuel cell stack, the produced water is continuously supplied to the flow path-forming porous layer 23. The surface of the respective pores in the flow path-forming porous layer 23 is thus fully coated with the film of the produced water. The pores in the flow path-forming porous layer 23 are continuously formed in the direction of its plane, as well as in the direction of its depth, as mentioned previously. The produced water is thus continuously present in the flow path-forming porous layer 23 both in the direction of the depth and in the direction of the plane. The produced water spreads along the surface of the pores in the flow path-forming porous layer 23. The pores accordingly have inner hollow spaces remain for the passage of the oxidizing gas in the flow path-forming porous layer 23.

As explained above, the oxidizing gas flowing through the inner-unit cell oxidizing gas flow path goes into the flow path-forming porous layer 23 in the vicinity of the gas outlet 68 and is discharged from the gas outlet 68 open at the end of the flow path-forming porous layer 23. The inner-unit cell oxidizing gas flow path defined by the grooves 62 and the flow path-forming porous layer 23 has a discharge port that is open at only the end of the flow path-forming porous layer 23. The inner-unit cell oxidizing gas flow path is designed to have a higher flow path resistance in a specific area in the neighborhood of the discharge port than a residual area. The specific area of the inner-unit cell oxidizing gas flow path in the vicinity of its discharge port is formed to have the enhanced flow path resistance or the increased pressure loss. On the assumption of a sufficient flow of the oxidizing gas supplied to the inner-unit cell oxidizing gas flow path, the oxidizing gas has a higher flow rate in the specific area in the vicinity of the discharge port than that in the residual area. The oxidizing gas having the increased flow rate in the vicinity of the discharge port of the inner-unit cell oxidizing gas flow path pulls a portion of the produced water on the surface of the pores in the flow path-forming porous layer 23. The pulled portion of the produced water is discharged with the oxidizing gas flow into the oxidizing gas exhaust manifold. Since the portion of the produced water is pulled at the end of the flow path-forming porous layer 23, the produced water is continuously present on the surface of the pores in the flow path-forming porous layer 23. The produced water in the flow path-forming porous layer 23 is thus pulled toward the gas outlet 68 as a whole. In power generation of the fuel cell with continuous production of water on the cathode, the oxidizing gas at the increased flow rate pulls the produced water at the end of the flow path-forming porous layer 23 toward the gas outlet 68. The produced water is thus continuously discharged from the flow path-forming porous layer 23. Closed arrows in FIG. 3 represent the flow of water in the flow path-forming porous layer 23.

As described above, in the fuel cell of the embodiment, the flow path-forming porous layer 23 leads the produced water on the cathode in the direction of its plane, while the oxidizing gas flowing through the inner-unit cell oxidizing gas flow path goes into the flow path-forming porous layer 23 and is discharged from the gas outlet 68. The produced water is continuously discharged with the oxidizing gas at the increased flow rate in the vicinity of the discharge port from the inner-unit cell oxidizing gas flow path. This arrangement desirably prevents the occurrence of a potential trouble caused by accumulation of the produced water in the inner-unit cell oxidizing gas flow path.

In the fuel cell of the embodiment, the inner-unit cell oxidizing gas flow path includes the space formed by the grooves 62 and the space formed by the pores in the flow path-forming porous layer 23. This arrangement desirably lowers the total pressure loss in the gas flow path, compared with a conventional design of the inner unit-cell gas flow path fully formed by the pores of the porous material. The lower pressure loss reduces a loss in auxiliary machinery for the supply of the oxidizing gas (for example, power consumption of a blower for supplying the air as the oxidizing gas) and thereby prevents a decrease in total energy efficiency of a fuel cell system.

In the fuel cell of the embodiment, the gold plating of titanium foam in the flow path-forming porous layer 23 arranged on the gas diffusion layer 22 increases the hydrophilicity on the surface of the flow path-forming porous layer 23. The produced water accordingly spreads along the surface of the pores over the whole area of the flow path-forming porous layer 23. This arrangement effectively prevents the produced water from being locally accumulated in the flow path-forming porous layer 23 and interfering with the smooth gas flow, thus restraining the potential decrease of the cell performance due to the water accumulation.

With a view to confirming the advantage of the fuel cell of the embodiment, the performance of a unit cell of the embodiment including the gas separator 25 with the flow path blockage area 65 is compared with the performance of a unit cell of a comparative example including a gas separator without the flow path blockage area 65. A connection area of an inner-unit cell oxidizing gas flow path and an oxidizing gas exhaust manifold in the unit cell of the comparative example is shown in the sectional view of FIG. 4, for the purpose of comparison with the corresponding area in the unit cell of the embodiment shown in FIG. 3. The unit cell of the comparative example has a gas separator 125, in place of the gas separator 25. The gas separator 125 has multiple grooves 162, in place of the multiple grooves 62 formed on the gas separator 25. Like the multiple grooves 62, the multiple grooves 162 are formed as multiple linear concaves arranged substantially in parallel with one another. The gas separator 125, however, has no flow path blockage area 65. The grooves 162 accordingly connect the slot 83 with the opposed slot 84, in the same manner as the grooves 63 in the unit cell of the embodiment. The unit cell of the comparative example has a gas outlet 168, in place of the gas outlet 68, as the discharge port of the oxidizing gas from the inner-unit cell oxidizing gas flow path. The like elements in the unit cell of the comparative example shown in FIG. 4 to those in the unit cell of the embodiment shown in FIG. 3 are expressed by the like numerals. A cooling medium flow path (not shown) is further provided in both the unit cell of the embodiment and the unit cell of the comparative example. The inner temperature of each unit cell is kept at a desired temperature level by regulating the temperature of a cooling medium flowing through the cooling medium flow path.

Figure 4:
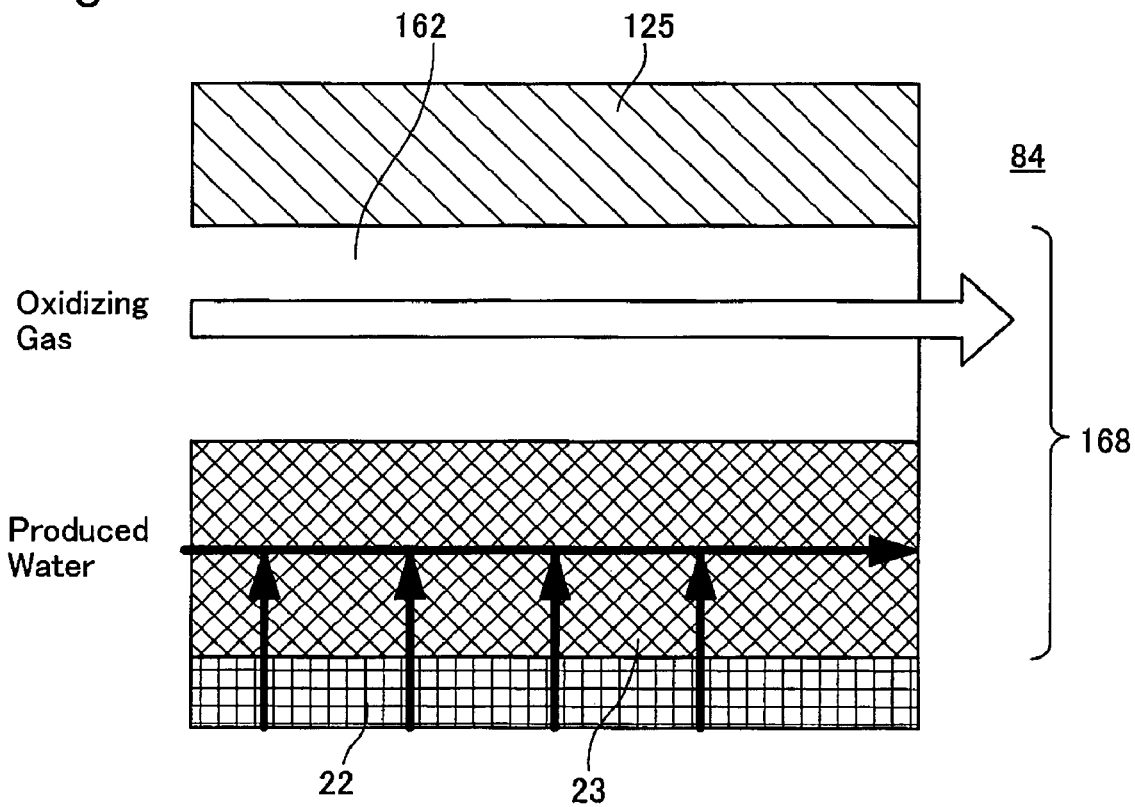
FIG. 4 is a sectional view showing the structure of a unit cell in a comparative example.

As shown in FIG. 4, in the unit cell of the comparative example, the gas separator 125 does not have the flow path blockage area 65. The oxidizing gas flowing through the space formed by the grooves 162 in the inner-unit cell oxidizing gas flow path does not go into the flow path-forming porous layer 23 in the vicinity of the gas outlet 168. The oxidizing gas is thus simply discharged from the gas outlet 168 formed at the end of the grooves 162 into the oxidizing gas exhaust manifold. Like the unit cell of the embodiment, since the surface of the flow path-forming porous layer 23 has the increased hydrophilicity, the produced water spreads along the surface of the pores over the whole area of the flow path-forming porous layer 23 in the unit cell of the comparative example. The flow of the oxidizing gas, however, does not positively go into the flow path-forming porous layer 23 in the neighborhood of the gas outlet 168. Unlike the unit cell of the embodiment, the produced water in the flow path-forming porous layer 23 is accordingly not pulled by the force of the oxidizing gas flow in the unit cell of the comparative example.

Figure 5:
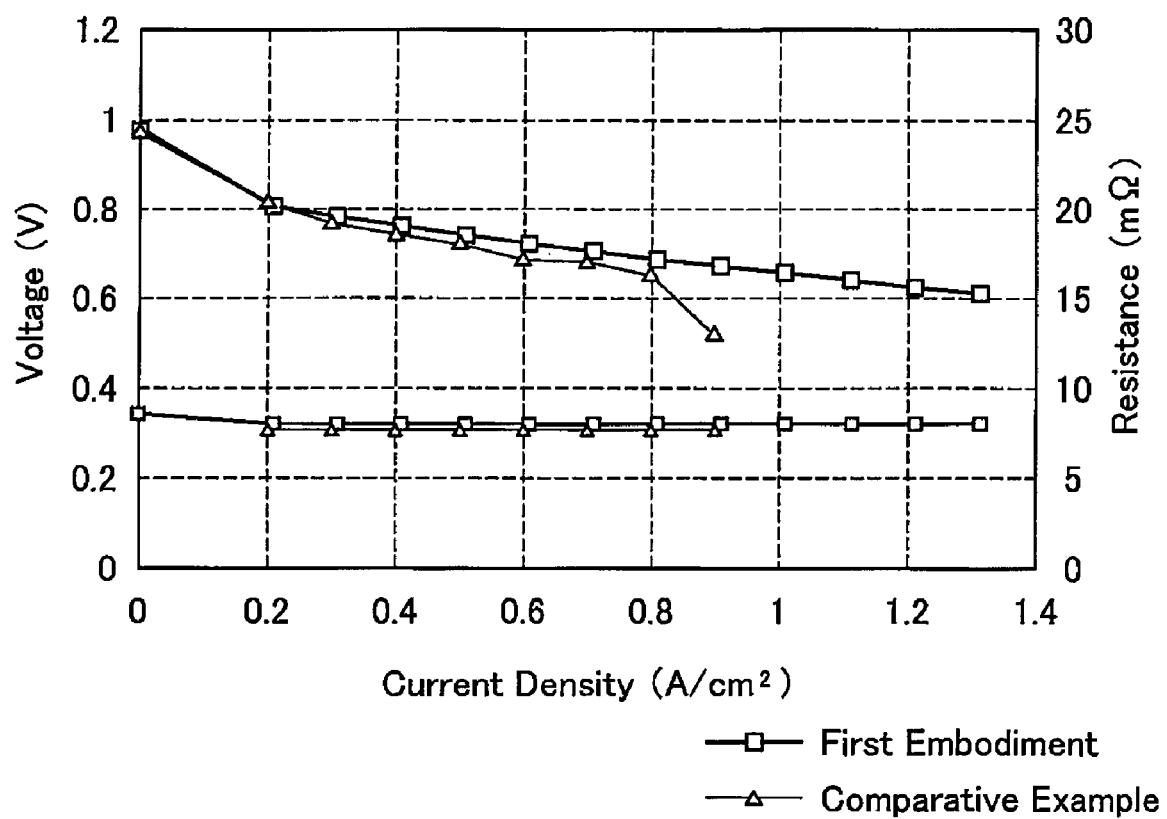
FIG. 5 is a graph showing power generation performances of the fuel cell of the embodiment and the unit cell of the comparative example.

The unit cell of the embodiment and the unit cell of the comparative example were subjected to power generation in a first condition. The first condition kept the outlet temperature of the cooling medium at 80° C. and humidified the fuel gas (hydrogen) and the oxidizing gas (the air) to attain the saturated vapor pressure at 80° C. A bubbler set at the temperature of 80° C. was used as a humidifier for humidifying the fuel gas and the oxidizing gas. The dew point temperatures of the fuel gas and the oxidizing gas were both controlled to 80° C. Under this first condition, both the unit cell of the embodiment and the unit cell of the comparative example showed the equivalent high performances. The current density in power generation was gradually changed with large excesses of the hydrogen supply and the oxygen supply (four times as large as their theoretically required quantities for a certain amount of power generation). In this state, both the unit cell of the embodiment and the unit cell of the comparative example kept the equivalent high voltage levels over a wide range of the current density. In both the unit cell of the embodiment and the unit cell of the comparative example, the porous material having the highly hydrophilic surface is used for the flow path-forming porous layer 23. The produced water accordingly spreads over the whole area of the flow path-forming porous layer 23 and is not accumulated locally. This characteristic ensures the sufficient diffusion of the reactive gas to the whole cathode plane and thus attains the high voltage level. In the temperature condition of 80° C., a relatively high rate of water discharge is expected in both the unit cell of the embodiment and the unit cell of the comparative example. In the higher current density range, however, the unit cell of the embodiment kept the higher output voltage than the unit cell of the comparative example. The graph of FIG. 5 shows variations in output voltage and in resistance against the current density measured in the first condition with regard to the unit cells of the embodiment and the comparative example.

The power generation of the unit cell of the embodiment and the unit cell of the comparative example were subsequently performed with a change of the condition from the first condition to a second condition. The second condition kept the outlet temperature of the cooling medium at 60° C. and humidified the fuel gas and the oxidizing gas with the bubbler to control the dew point temperature of the fuel gas to 60° C. and the dew point temperature of the oxidizing gas to 80° C. Namely the second condition set the lower operating temperature of the fuel cell and humidified the oxidizing gas to be in an excess of the water content. Power generation was performed at a fixed current density with a large excess of the hydrogen supply and with a gradual decrease in oxygen supply from a large excess. As long as the oxygen supply was sufficient and exceeded its theoretically required quantity, the unit cell of the embodiment continued power generation at a stable voltage level. The unit cell of the comparative example, however, could not continue power generation because of an abrupt drop of the voltage level immediately after start of the power generation. As mentioned previously, the unit cell of the embodiment utilizes the increased flow rate of the oxidizing gas to forcibly discharge the produced water from the flow path-forming porous layer 23. The result of this experiment proves that such forcible water discharge enables power generation to be favorably continued even in the condition of the excess water content at the relatively low temperature that causes difficulty in spontaneous water discharge from the flow path-forming porous layer 23 by means of vaporization of the water content.

The unit cell of the comparative example was dried after the experiment in the second condition and was again subjected to power generation in the first condition. The unit cell of the comparative example recovered the power generation performance equivalent to its initial level. According to this result, the failed power generation of the unit cell of the comparative example in the second condition may be ascribed to accumulation of the produced water in the flow path-forming porous layer 23 that interferes with the smooth gas flow.

C. Second Embodiment

Figure 6:
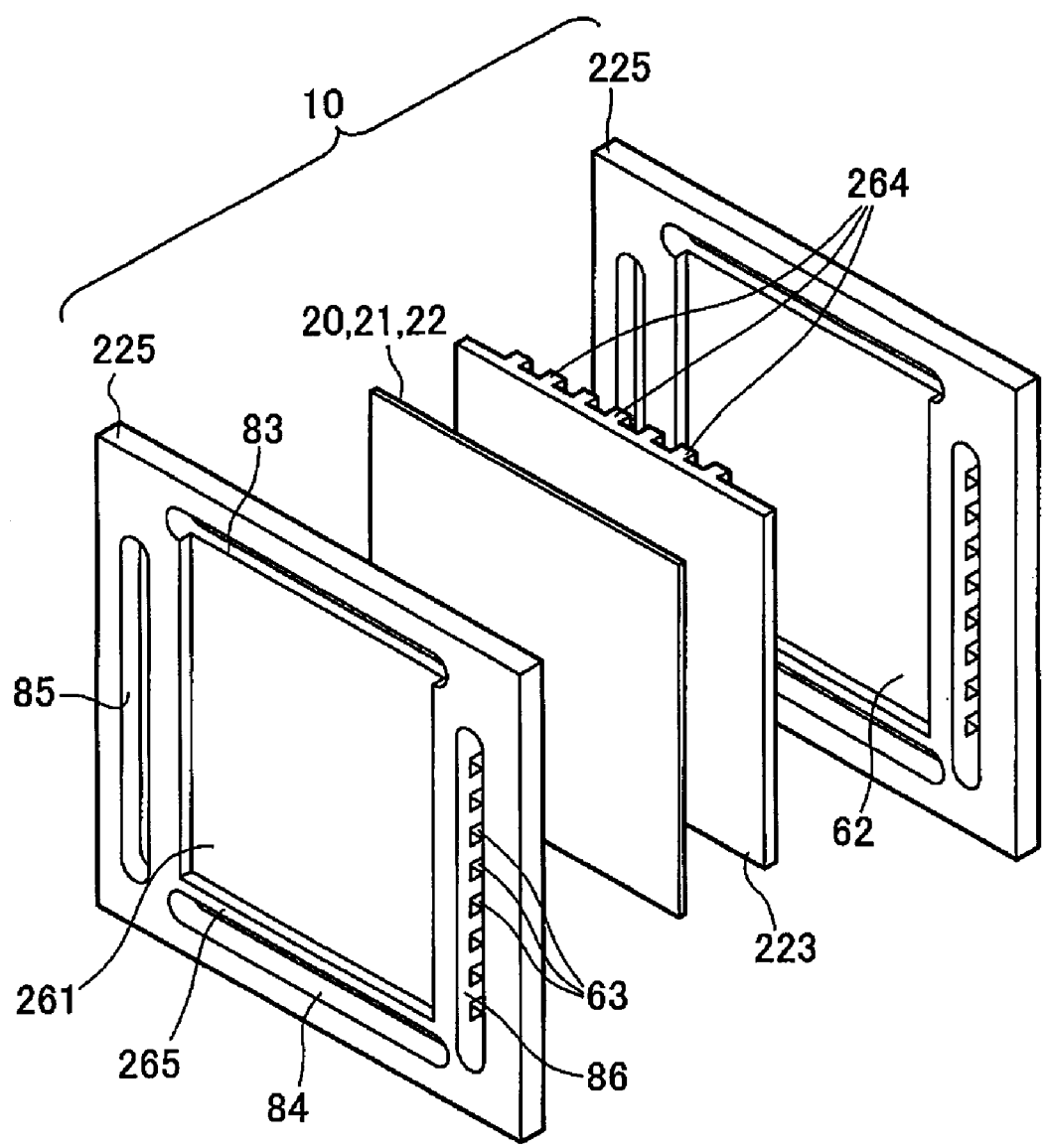
FIG. 6 is a decomposed perspective view illustrating the schematic structure of a fuel cell in a second embodiment.

In the unit cell structure of the first embodiment, the flow path-forming porous layer 23 has a flat plane, while the surface of the gas separator 25 is designed to have the grooves 62 for formation of the inner-unit cell oxidizing gas flow path. This unit cell structure is, however, not restrictive but may be modified. FIG. 6 is a decomposed perspective view illustrating the structure of a fuel cell in a second embodiment having the reverse concave-convex relation between a gas separator and a flow path-forming porous layer. The fuel cell of the second embodiment has a gas separator 225 and a flow path-forming porous layer 223, in place of the gas separator 25 and the flow path-forming porous layer 23. The like elements in the fuel cell of the second embodiment shown in FIG. 6 to those in the fuel cell of the first embodiment shown in FIG. 1 are expressed by the like numerals and are not specifically described here.

The gas separator 225 has a substantially rectangular recess 261 having a flat bottom plane on a side face opposed to the cathode. The recess 261 has one side communicating with the slot 83 for formation of the oxidizing gas supply manifold and the opposite side isolated from the slot 84 for formation of the oxidizing gas exhaust manifold. There is a linear convex as a flow path blockage area 265 between the opposed side of the recess 261 and the slot 84.

Figure 7:
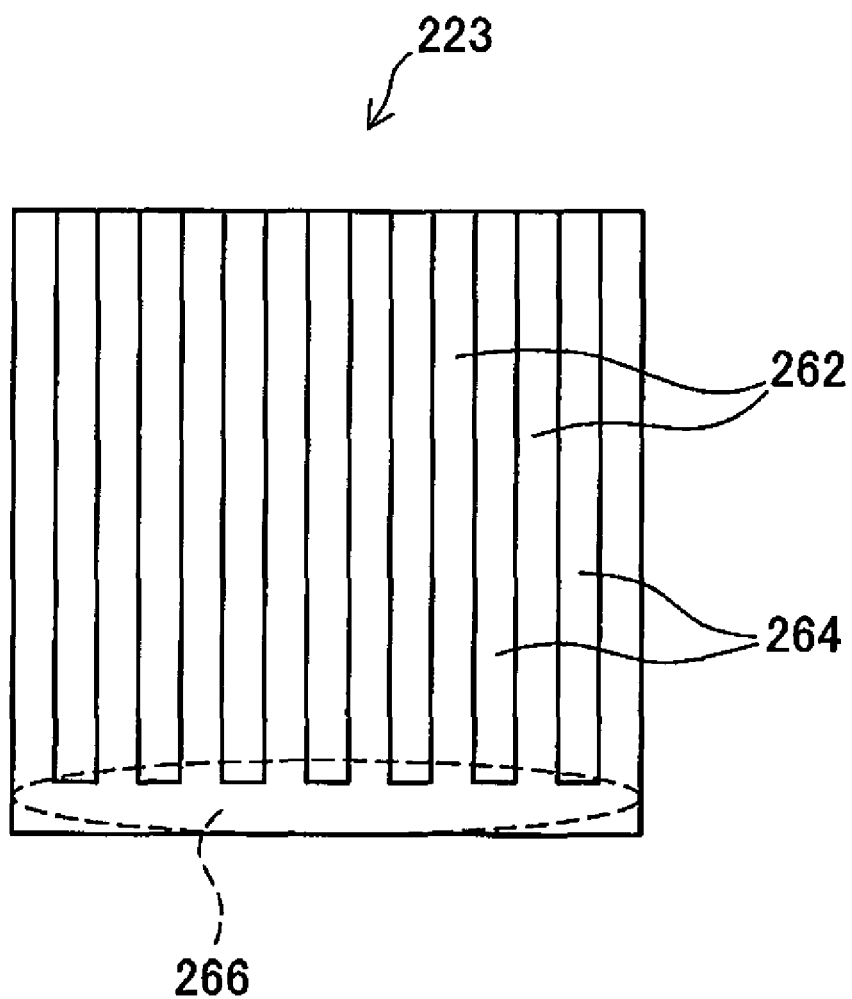
FIG. 7 is a plan view schematically showing a flow-path forming porous layer included in the fuel cell of the second embodiment.

Like the flow path-forming porous layer 23, the flow path-forming porous layer 223 is a substantially rectangular thin plate member made of gold-plated titanium foam. The flow path-forming porous layer 223 has multiple linear convexes as projections 264 on a face opposed to the recess 261 of the gas separator 225. The multiple projections 264 are substantially in parallel to one another and have a height substantially equal to the depth of the recess 261. Multiple grooves 262 defined by the adjacent projections 264 form, in combination with the gas separator 225, a space functioning as an inner-unit cell oxidizing gas flow path. FIG. 7 is a plan view showing one face of the flow path-forming porous layer 223 with the multiple projections 264 formed thereon. The projections 264 are extended in its longitudinal direction from a side corresponding to the slot 83 of the gas separator 225 to a side corresponding to the slot 84 of the gas separator 225. The flow path-forming porous layer 223 has a flat area 266 without the projections 264 in the periphery of the side corresponding to the slot 84 of the gas separator 225. The flat area 266 has a width substantially equal to the width of the flow path blockage area 265. The length of each projection 264 is substantially identical with the length of the recess 261 between the slot 83 and the flow path blockage area 265 on the gas separator 225. In assembly of the fuel cell, the flow path-forming porous layer 223 is fit in the recess 261 of the gas separator 225 such that the top ends of the respective projections 264 are in contact with the bottom plane of the recess 261. The flat area 266 of the flow path-forming porous layer 223 is in contact with the flow path blockage area 265 of the gas separator 225. The other face of the gas separator 225 facing the anode has the same structure as that of the gas separator 25 of the first embodiment.

In the fuel cell of the second embodiment described above, the oxidizing gas flows through the inner-unit cell oxidizing gas flow path, which includes the space formed by the grooves 262 provided on the flow path-forming porous layer 223 and the space formed by the pores in the flow path-forming porous layer 223. At the end of the inner-unit cell oxidizing gas flow path, the flow of the oxidizing gas is blocked by the flow path blockage area 265 that is in contact with the flat area 266 of the flow path-forming porous layer 223 and goes into the flat area 266 of the flow path-forming porous layer 223 to be discharged into the oxidizing gas exhaust manifold. The fuel cell structure of the second embodiment accordingly has the similar advantages to those of the fuel cell structure of the first embodiment described above.

D. Third Embodiment

Figure 8:
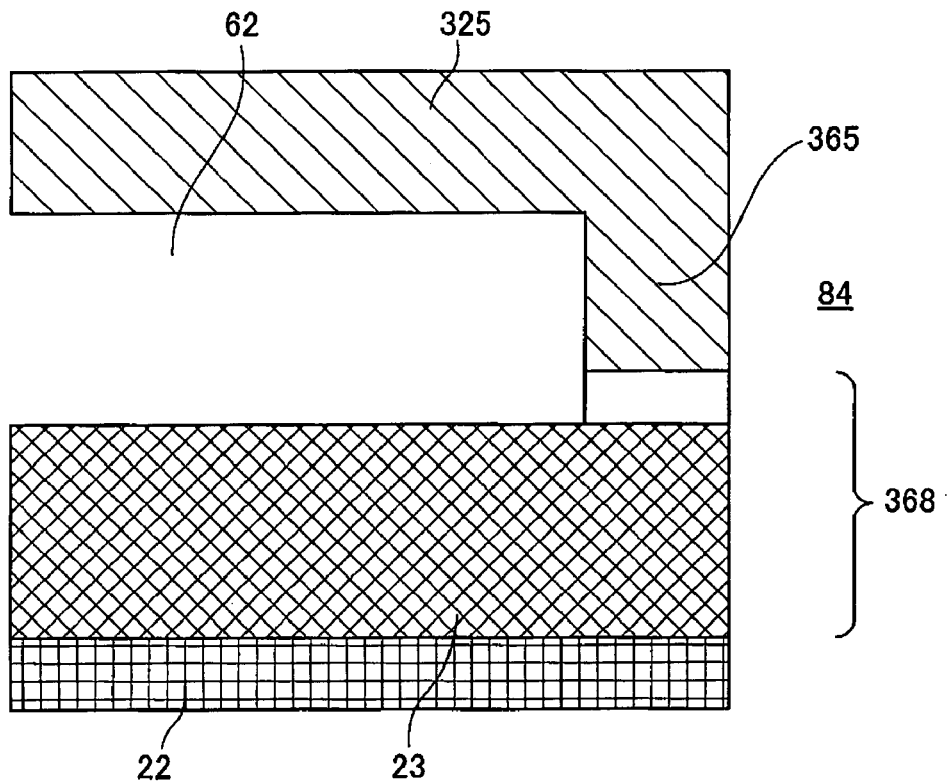
FIG. 8 is a sectional view showing the schematic structure of a fuel cell in a third embodiment.

In the fuel cell structures of the first embodiment and the second embodiment, the flow of the oxidizing gas wholly goes into the flow path-forming porous layer at the end of the inner-unit cell oxidizing gas flow path. This arrangement is, however, not essential, but another arrangement may be adopted instead. FIG. 8 is a sectional view showing the schematic structure of a fuel cell in a third embodiment. The illustrated area of FIG. 8 corresponds to the structure of the first embodiment shown in FIG. 3. The fuel cell of the third embodiment has a similar structure to that of the fuel cell of the first embodiment, except a gas separator 325 in place of the gas separator 25. The like elements in the fuel cell of the third embodiment shown in FIG. 8 to those in the fuel cell of the first embodiment shown in FIG. 1 are expressed by the like numerals and are not specifically described here.

The gas separator 325 included in the fuel cell of the third embodiment has a flow path blockage area 365 at the corresponding position of the flow path blockage area 65 provided on the gas separator 25. The flow path blockage area 365 has a less height than that of the flow path blockage area 65 and is accordingly not contact with the flow path-forming porous layer 23. A gas outlet 368 for discharge of the oxidizing gas from the inner unit-cell oxidizing gas flow path is designed to be open to part of the cross section of the space formed by the grooves 62, as well as to the end of the flow path-forming porous layer 23.

In the fuel cell structure of the third embodiment, since the gas outlet 368 is open to part of the cross section of the space formed by the grooves 62, part of the oxidizing gas does not go into the flow path-forming porous layer 23 but is directly discharged. The open area of the gas outlet 368 to the space formed by the grooves 62 is significantly smaller than the whole cross section of the space formed by the grooves 62. The flow of the oxidizing gas has a greater flow resistance at the discharge from the open area of the gas outlet 368 than the flow resistance in the space formed by the grooves 62. The flow of the oxidizing gas going into the flow path-forming porous layer 23 is thus encouraged in the vicinity of the gas outlet 368. Namely the water-pulling force from the surface of the pores is enhanced at the end of the flow path-forming porous layer 23. This arrangement attains the similar effect to that of the first embodiment and enables the efficient continuous water discharge by means of the gas flow. This structure is not restrictive but may be modified in various ways to attain the similar effect. The required structure for this advantage has a gas outlet that is open to be at least partly overlapped with the end of the flow path-forming porous layer 23. The structure enables the flow of the oxidizing gas to have a higher flow resistance in the vicinity of the gas outlet than the flow resistance in the residual area of the inner-unit cell oxidizing gas flow path.

Figure 9:
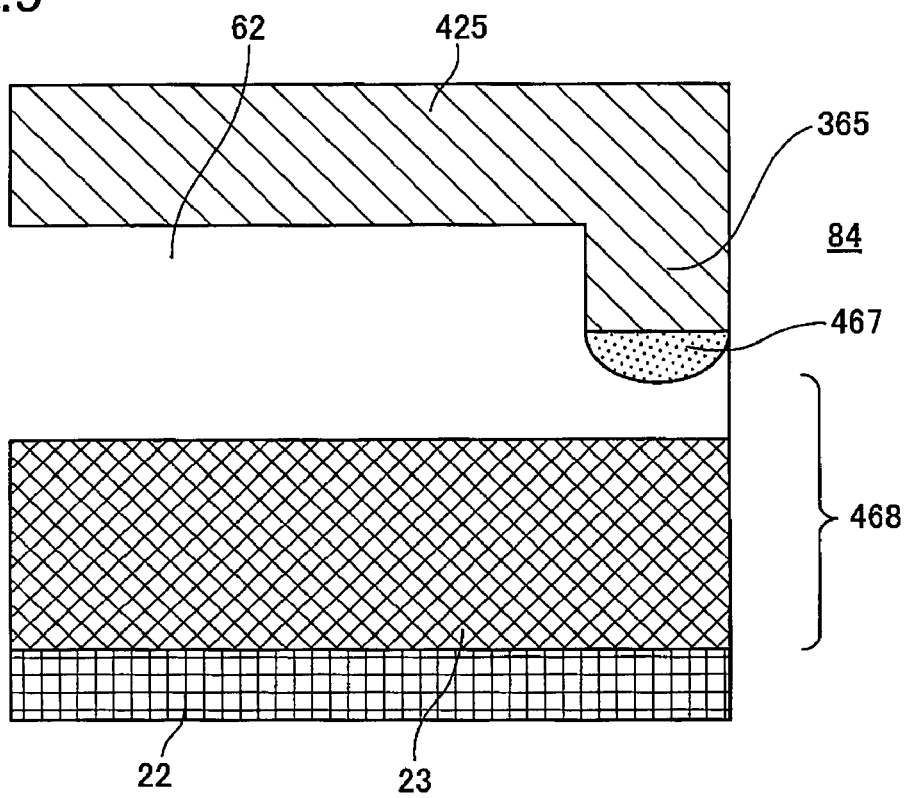
FIG. 9 is a sectional view showing the schematic structure of a fuel cell in one modification of the third embodiment.

In the fuel cell structure of the third embodiment, a water-absorbing polymer material may be provided at the gas outlet. FIG. 9 is a sectional view showing the schematic structure of a fuel cell in one modification of the third embodiment. The illustrated area of FIG. 9 corresponds to the structure of the first embodiment shown in FIG. 3. The fuel cell of this modified example has a similar structure to that of the fuel cell of the third embodiment, except a gas separator 425 and a gas outlet 468 in place of the gas separator 325 and the gas outlet 368. The like elements in the fuel cell of the modified example shown in FIG. 9 to those in the fuel cell of the third embodiment shown in FIG. 8 are expressed by the like numerals and are not specifically described here.

Like the gas separator 325, the gas separator 425 included in the fuel cell of the modification of the third embodiment has a flow path blockage area 365 that has a less height than that of the flow path blockage area 65 and is not in contact with the flow path-forming porous layer 23. The gas outlet 468 for discharge of the oxidizing gas from the inner unit-cell oxidizing gas flow path is designed to be open to part of the cross section of the space formed by the grooves 62, as well as to the end of the flow path-forming porous layer 23. An opening regulator 467 made of a water-absorbing material is provided on the flow path blockage area 365 at the end opposed to the flow path-forming porous layer 23. Namely part of the wall of the gas outlet 468 is formed by the opening regulator 467. The water-absorbing material absorbs the water content to be swollen in the high water content environment, while releases the water content to be contracted in the low water content environment. The water-absorbing material is typically a water-absorbing polymer, such as polyvinyl alcohol, polyacrylonitrile, or polyvinylpyrrolidone.

The opening regulator 467 absorbs water to be swollen in the environment of the increased water content in the vicinity of the opening regulator 467. This narrows the opening area of the gas outlet 468. The opening regulator 467 releases water to be contracted, on the other hand, in the environment of the decreased water content in the vicinity of the opening regulator 467. This widens the opening area of the gas outlet 468. In the fuel cell structure of the modification of the third embodiment, in the condition of the high water content in the oxidizing gas, the gas outlet 468 is narrowed to increase the flow of the oxidizing gas going into the flow path-forming porous layer 23. Namely the high water content in the oxidizing gas strengthens the water pulling force from the end of the flow path-forming porous layer 23, thus enhancing the efficiency of water discharge. In the condition of the low water content in the oxidizing gas, on the other hand, the gas outlet 468 is widened to decrease the flow of the oxidizing gas going into the flow path-forming porous layer 23. Namely the low water content in the oxidizing gas weakens the water pulling force from the end of the flow path-forming porous layer 23, thus restricting the water discharge.

E. Fourth Embodiment

Figure 10:
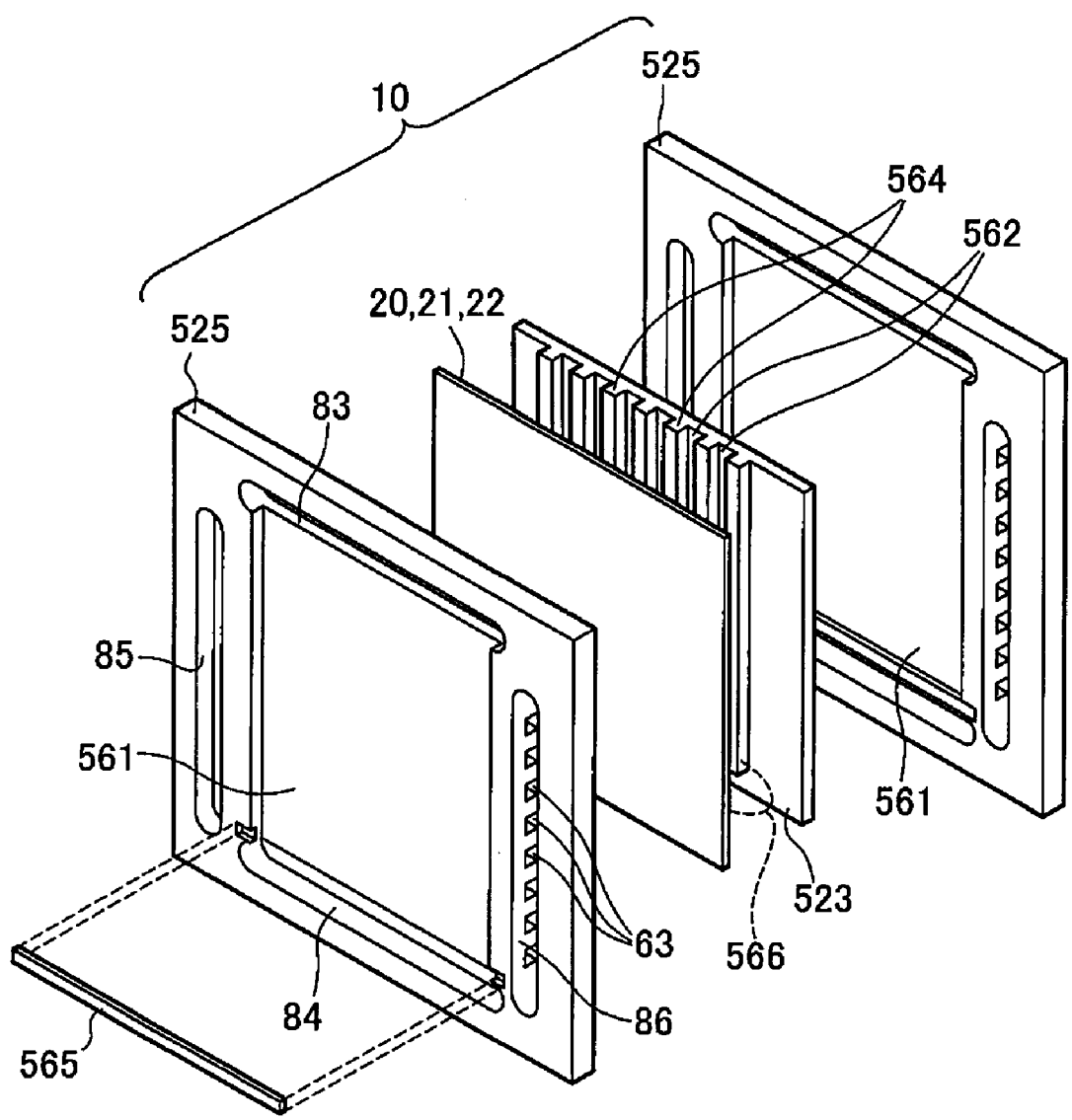
FIG. 10 is a decomposed perspective view illustrating the schematic structure of a fuel cell in a fourth embodiment.
Figure 11:
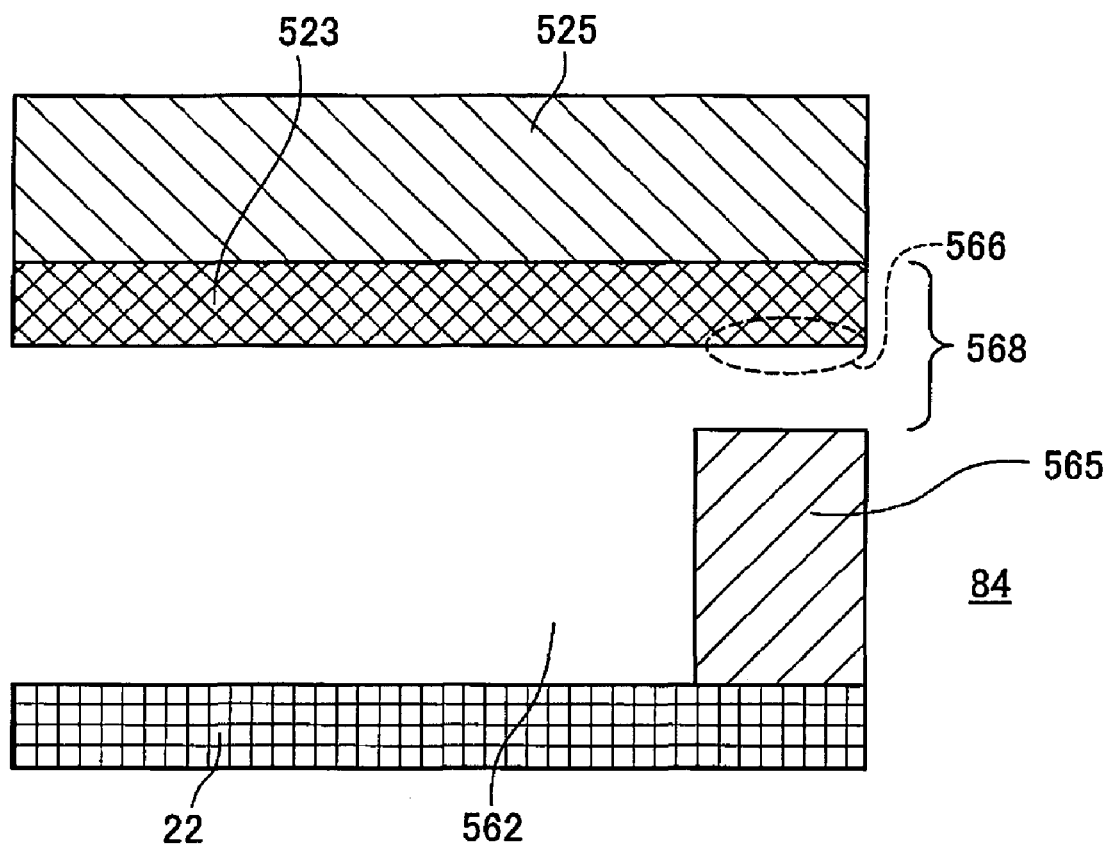
FIG. 11 is a sectional view showing the structure of the fuel cell of the fourth embodiment.

In the fuel cell structures of the first through the third embodiments, the flow path-forming porous layer 23 is located on the gas diffusion layer 22. This structure is, however, not essential, but a different structure may be adopted for the same purpose. In the different fuel cell structure, a first water guide element for continuously guiding the water produced on the electrode in the plane direction of the electrode may be located to be not in plane contact with the electrode but to be separate from the electrode. FIG. 10 is a decomposed perspective view schematically illustrating the structure of a fuel cell in a fourth embodiment. The fuel cell of the fourth embodiment has a gas separator 525 and a water guide porous layer 523, in place of the gas separator 25 and the flow path-forming porous layer 23. FIG. 11 shows the end of an inner unit-cell oxidizing gas flow path in the fuel cell of the fourth embodiment. The illustrated area of FIG. 11 corresponds to the structure of the first embodiment shown in FIG. 3. The like elements in the fuel cell of the fourth embodiment shown in FIGS. 10 and 11 to those in the fuel cell of the first embodiment shown in FIG. 1 are expressed by the like numerals and are not specifically described here.

The gas separator 525 has a substantially rectangular recess 561 having a flat bottom plane on a side face opposed to the cathode. The recess 561 communicates with both the slot 83 for formation of the oxidizing gas supply manifold and the slot 84 for formation of the oxidizing gas exhaust manifold. A long thin plate member functioning as a flow path blockage area 565 is fit along and close to the slot 84 in the recess 561. The flow path blockage area 565 has a less depth than the depth of the recess 561 and is not in contact with the bottom plane of the recess 561. The top of the flow path blockage area 565 is located substantially in the same plane as the periphery of the gas separator 525 around the recess 561. A space forming a gas outlet 568 accordingly remains between the recess 561 and the flow path blockage area 565 (see FIG. 11).

Like the flow path-forming porous layer 23, the water guide porous layer 523 is a substantially rectangular thin plate member made of gold-plated titanium foam. The water guide porous layer 523 has a flat plane on one face and multiple linear convexes as projections 564 on the other face. The multiple projections 564 are substantially in parallel to one another. The profile of the water guide porous layer 523 is designed to be substantially fit to the shape of the recess 561 of the gas separator 525. The water guide porous layer 523 is fit in the recess 561, such that the flat face of the water guide porous layer 523 is in contact with the flat bottom plane of the recess 561 of the gas separator 525. In assembly of the fuel cell, the top ends of the respective projections 564 formed on the other face of the water guide porous layer 523 facing the cathode are in contact with the gas diffusion layer 22. Multiple grooves 562 defined by the adjacent projections 564 form, in combination with the gas diffusion layer 22, a space functioning as an inner-unit cell oxidizing gas flow path. The projections 564 are extended in its longitudinal direction from a side corresponding to the slot 83 of the gas separator 525 to a side corresponding to the slot 84 of the gas separator 525. The water guide porous layer 523 has a flat area 566 without the projections 564 in the periphery of the side corresponding to the slot 84 of the gas separator 525 (see FIG. 10). This flat area 566 formed on the water guide porous layer 523 is similar to the flat area 266 formed on the flow path-forming porous layer 223 of the second embodiment shown in FIG. 7. In the unit cell structure of this embodiment, the thickness of the flat area 566 is less than the distance between the bottom plane of the recess 561 and the flow path blockage area 565 fit in the gas separator 525. The gas outlet 568 is accordingly open to part of the cross section of the space formed by the grooves 562, as well as to the end of the water guide porous layer 523 (see FIG. 11). The cross section of FIG. 11 corresponds to the space formed by the grooves 562 and does not show the projections 564.

In the fuel cell structure of the fourth embodiment, the water produced on the cathode runs along the projections 564 formed on the other face of the water guide porous layer 523, is guided toward the flat face of the water guide porous layer 523 located on the surface of the gas separator 525, and is then led in the electrode plane direction on the flat face of the water guide porous layer 523. Namely the projections 564 work as a second water guide element to migrate the water from the electrode toward the flat face of the water guide porous layer 523 as the first water guide element of continuously guiding the water in the electrode plane direction. The oxidizing gas flows through the inner-unit cell oxidizing gas flow path defined by the grooves 562. The flow path blockage area 565 increases the flow resistance of the oxidizing gas in the vicinity of the gas outlet 568. Like the fuel cell structures of the first through the third embodiments, this structure of the fourth embodiment encourages the flow of the oxidizing gas going into the water guide porous layer 523 in the vicinity of the gas outlet 568. The flow of the oxidizing gas pulls the water continuously present on the surface of the pores in the water guide porous layer 523, thus attaining continuous water discharge from the inner-unit cell oxidizing gas flow path.

In the fuel cell structure of the fourth embodiment, there is a gap between the flat area 566 on the end of the water guide porous layer 523 and the flow path blockage area 565. This structure is, however, not restrictive. There may be no gap, but the flat area 566 may be in contact with the flow path blockage area 565. In this modified structure, the flow of the oxidizing gas is wholly introduced into the water guide porous layer 523 as in the structure of the first embodiment. In the fuel cell structure of the fourth embodiment, the first water guide element of guiding the water in the plane direction and the second water guide element of migrating the water from the electrode toward the first water guide element are integrally formed as the water guide porous layer 523. The first water guide element and the second water guide element may, however, be provided separately.

F. Fifth Embodiment

In the fuel cell structures of the first through the fourth embodiments, the flow of the oxidizing gas running through the porous layer functioning as the first water guide element or through the space formed by the grooves on the surface of the gas separator is blocked by the flow path blockage area and is made to go into the porous layer in the vicinity of the gas outlet. This structure is, however, not essential, but a different structure may be adopted for the same purpose. In the different fuel cell structure, the end of the space formed by the grooves may be blocked by a porous layer formed integrally with a first water guide element to form a gas outlet. This structure is described below as a fifth embodiment.

Figure 12:
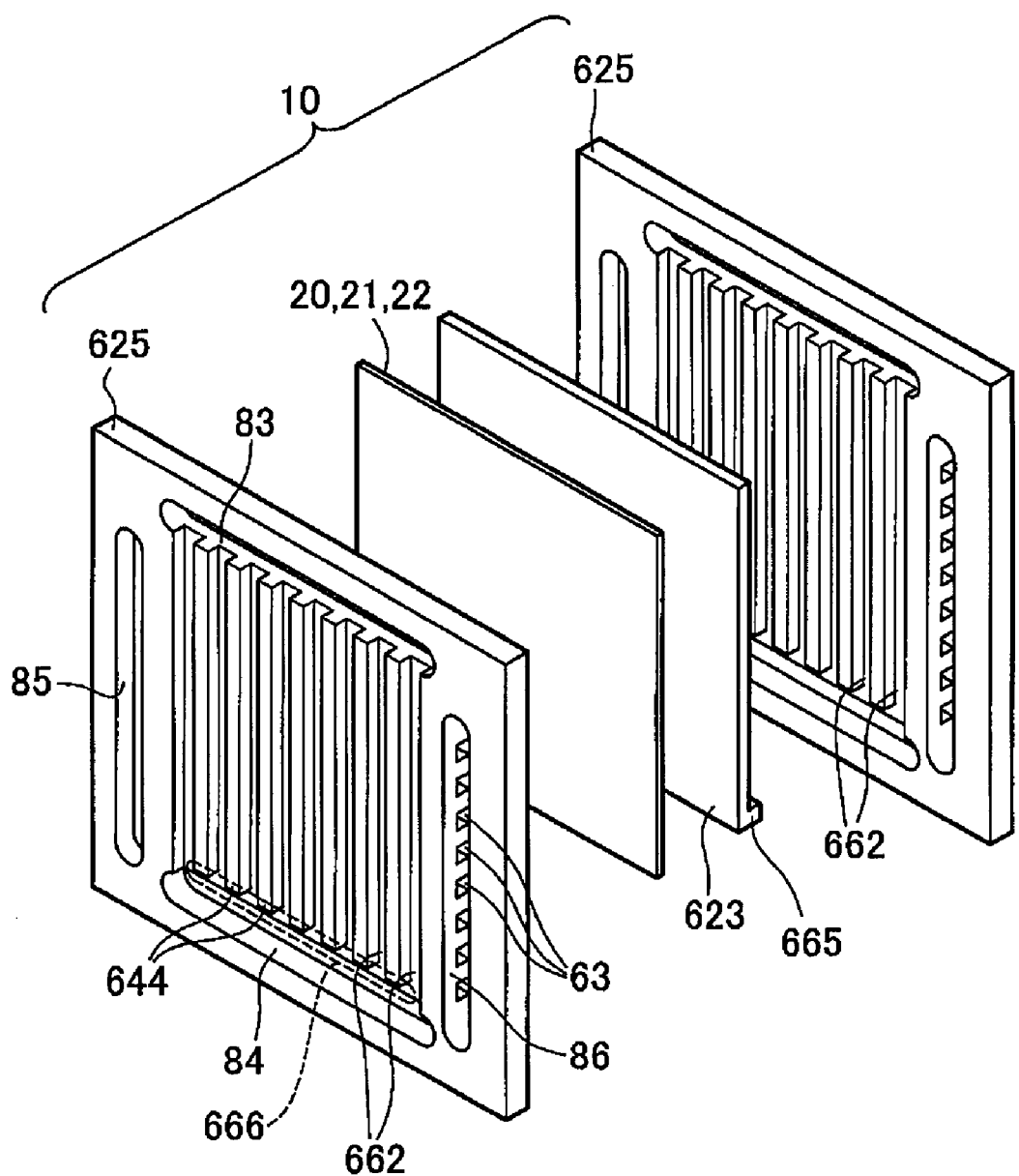
FIG. 12 is a decomposed perspective view illustrating the schematic structure of a fuel cell in a fifth embodiment.
Figure 13:
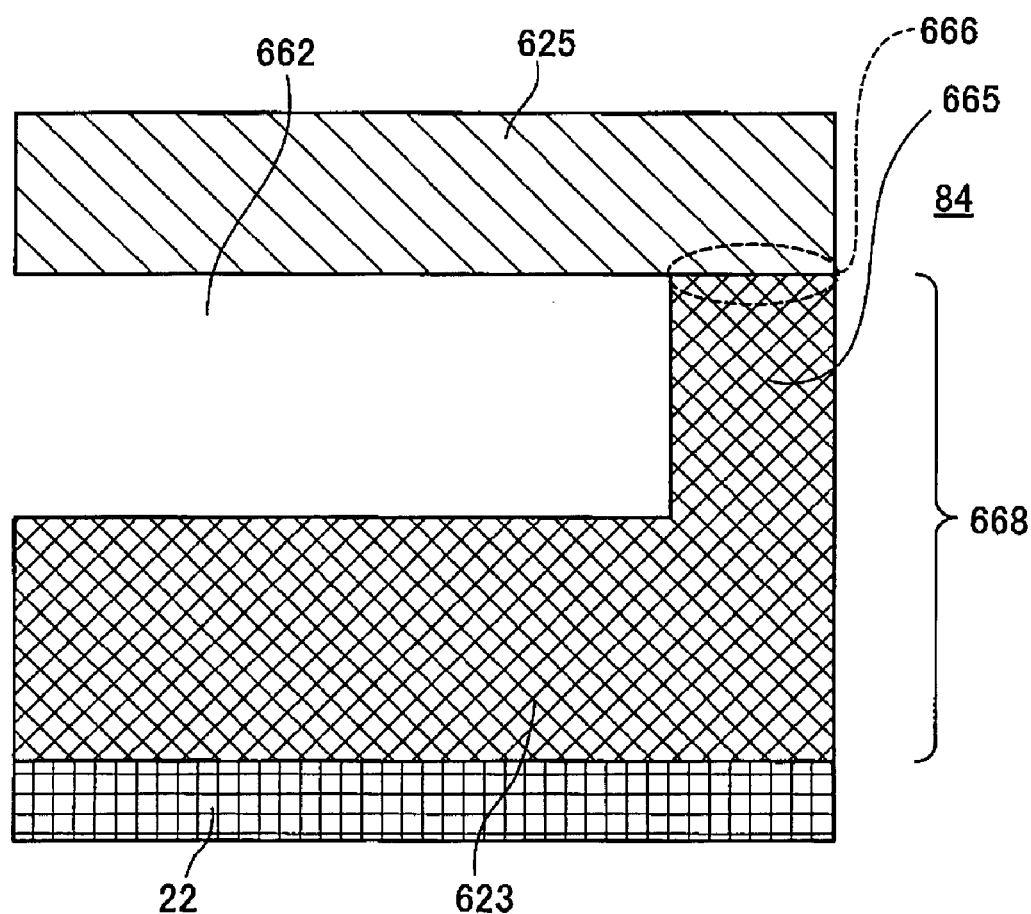
FIG. 13 is a sectional view showing the structure of the fuel cell of the fifth embodiment.

FIG. 12 is a decomposed perspective view schematically illustrating the structure of a fuel cell in a fifth embodiment. The fuel cell of the fifth embodiment has a gas separator 625 and a flow path-forming porous layer 623, in place of the gas separator 25 and the flow path-forming porous layer 23. FIG. 13 shows the end of an inner unit-cell oxidizing gas flow path in the fuel cell of the fifth embodiment. The illustrated area of FIG. 13 corresponds to the structure of the first embodiment shown in FIG. 3. The like elements in the fuel cell of the fifth embodiment shown in FIGS. 12 and 13 to those in the fuel cell of the first embodiment shown in FIG. 1 are expressed by the like numerals and are not specifically described here.

The gas separator 625 has the concave-convex structure on a face opposed to the cathode. The concave-convex structure has multiple linear convexes as projections 664 arranged substantially in parallel to one another and multiple grooves 662 defined by the adjacent projections 664. The grooves 662 communicate with the slot 83 on one end and with the slot 84 on the other end. Like the grooves 62 of the first embodiment, the multiple grooves 662 form, in combination with the flow path-forming porous layer 623, a space functioning as an inner-unit cell oxidizing gas flow path. One ends of the respective projections 664 reach the position of the slot 83, while the other ends of the respective projections 664 are apart from the position of the slot 84. There is a recess 666 formed along and close to the slot 84 (see FIG. 12). The recess 666 has a flat bottom plane without the projections 664 and is continuous with the grooves 62.

Like the flow path-forming porous layer 23, the flow path-forming porous layer 623 is a substantially rectangular thin plate member made of gold-plated titanium foam. The flow path-forming porous layer 623 is located to cover a center area between the slots 84 of the gas separator 625. The flow path-forming porous layer 623 has a flat plane on one face, which is located on the gas diffusion layer 22. The other face of the flow path-forming porous layer 623 has a linear projection 665 formed along a side corresponding to the slot 84. The linear projection 665 has substantially the same height as that of the projections 664 formed on the gas separator 625. In assembly of the flow path-forming porous layer 623 and the gas separator 625, the linear projection 665 is fit in the recess 666 formed on the surface of the gas separator 625. The top ends of the respective projections 664 provided on the gas separator 625 accordingly come into contact with the surface of the flow path-forming porous layer 623, while the top end of the linear projection 665 provided on the flow path-forming porous layer 623 is in contact with the bottom plane of the recess 666 on the surface of the gas separator 625 (see FIG. 13). The cross section of FIG. 13 corresponds to the space formed by the grooves 662 and does not show the projections 664.

In the fuel cell structure of the fifth embodiment, the water produced on the cathode goes along the hydrophilic surface of the pores in the flow path-forming porous layer 623 and is led in the electrode plane direction. The end of the space formed by the grooves 662 is blocked by the linear projection 665 provided on the flow path-forming porous layer 623. The oxidizing gas running through the space formed by the grooves 662 is then flowed through the space formed by the pores in the linear projection 665 of the porous material and is discharged into the oxidizing gas exhaust manifold of the slot 84. The inner space formed in the linear projection 665 of the porous material has a relatively high resistance of the gas flow. There is accordingly a large pressure loss in passage of the oxidizing gas through the pores in the linear projection 665 of the porous material. The linear projection 665 is integrally formed with the flow path-forming porous layer 623. The presence of water inside the flow path-forming porous layer 623 thus continues to the surface of the pores in the linear projection 665. The flow rate of the oxidizing gas is increased in passage through the inner space of the linear projection 665 for discharge. The increased flow rate of the oxidizing gas strongly pulls the water continuously present on the surface of the pores in the linear projection 665, thus attaining continuous water discharge from the inner-unit cell oxidizing gas flow path.

In the fuel cell structure of the fifth embodiment, the multiple grooves 662 are formed on the surface of the gas separator 625 to define the inner-unit cell oxidizing gas flow path as in the fuel cell structure of the first embodiment. Like the second embodiment, the concave-convex relation may be reversed between the gas separator and the flow path-forming porous layer. In this modified structure, the flow path-forming porous layer 623 has multiple projections similar to the projections 264 of the second embodiment, in addition to the linear projection 665.

In the fuel cell structure of the fifth embodiment, the linear projection 665 provided on the flow path-forming porous layer 623 is in contact with the bottom plane of the recess 666 of the gas separator 625. There may, however, be a gap between the linear projection 665 and the recess 666 to prevent part of the oxidizing gas from flowing through the inner space of the linear projection 665. In this modified structure, the flow resistance of the oxidizing gas is also increased in the vicinity of the gas outlet 668. The modified structure thus ensures the similar advantage to that of the structure of the fifth embodiment.

Figure 14:
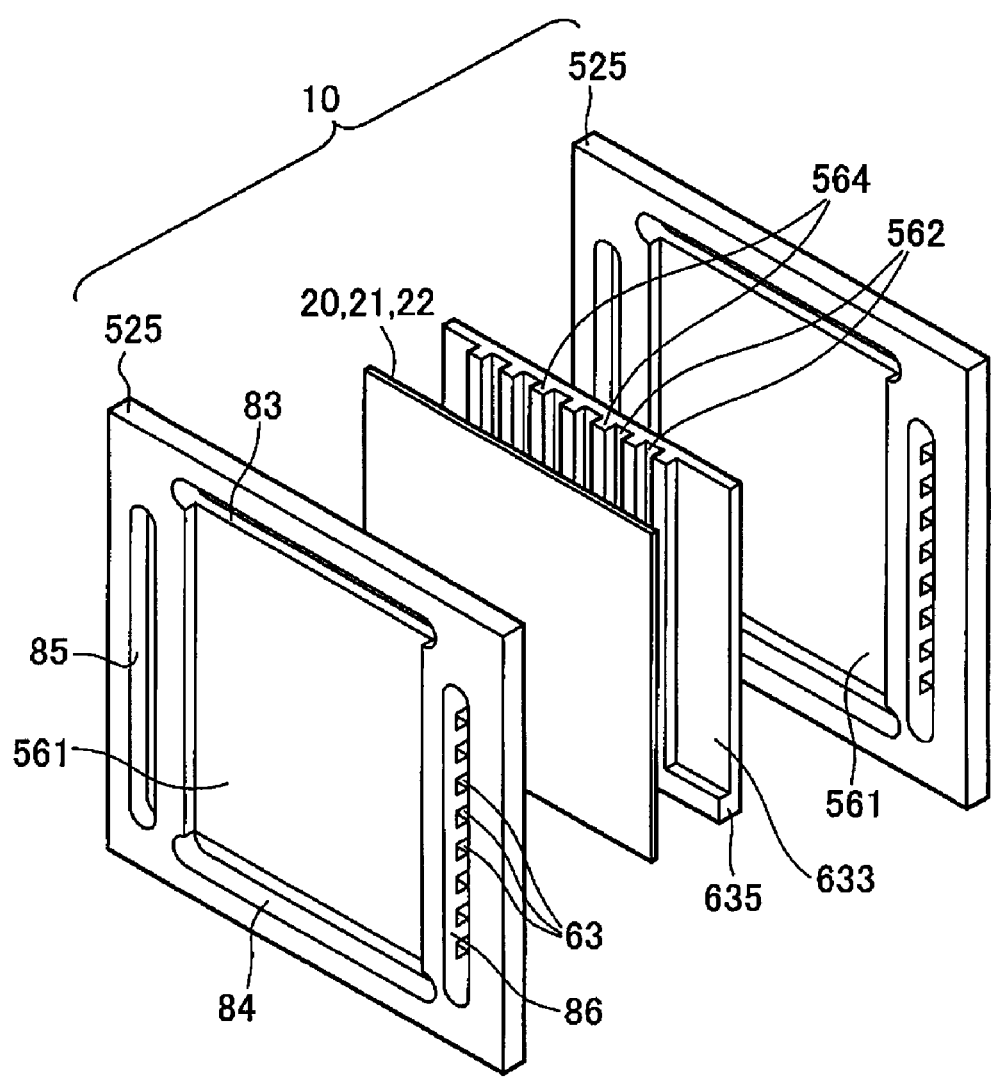
FIG. 14 is a decomposed perspective view illustrating the schematic structure of a fuel cell in one modification of the fifth embodiment.
Figure 15:
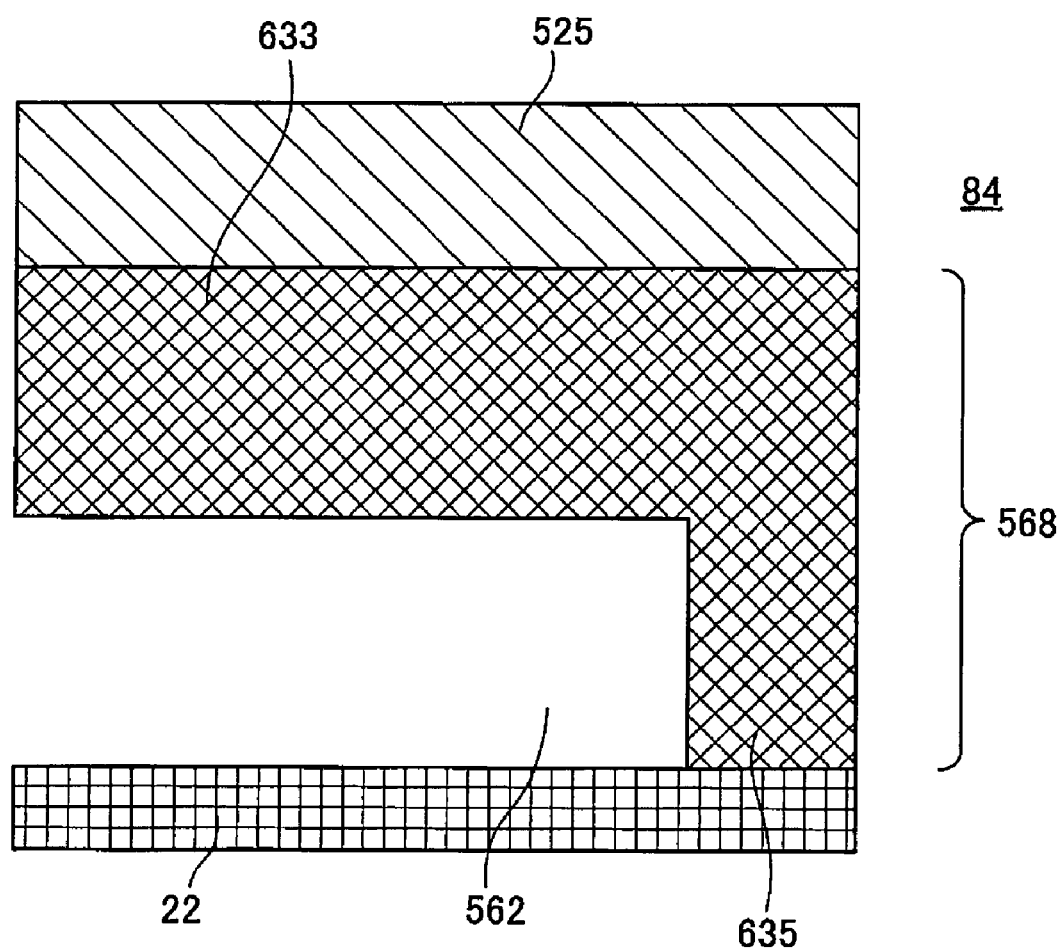
FIG. 15 is a sectional view showing the structure of the fuel cell in the modification of the fifth embodiment.

The flow path-forming porous layer 623 that is in plane contact with the gas diffusion layer 22 may be replaced by a water guide porous layer that is located to be in contact with the surface of a gas separator and guides the water in the electrode plane direction on the gas separator like the fourth embodiment. This modified structure is described below as one modified example of the fifth embodiment. FIG. 14 is a decomposed perspective view schematically illustrating the structure of a fuel cell in one modification of the fifth embodiment. FIG. 15 shows the end of an inner unit-cell oxidizing gas flow path in the fuel cell of the modification of the fifth embodiment. The illustrated area of FIG. 15 corresponds to the structure of the first embodiment shown in FIG. 3. The like elements in the fuel cell of the modification of the fifth embodiment shown in FIGS. 14 and 15 to those in the fuel cell of the fourth embodiment shown in FIG. 10 are expressed by the like numerals and are not specifically described here. The fuel cell in the modification of the fifth embodiment has a water guide porous layer 633, in place of the water guide porous layer 523 of the fourth embodiment. Like the water guide porous layer 523, the water guide porous layer 633 has multiple substantially parallel projections 564 and multiple grooves 562 defined by the adjacent projections 564 on one face opposed to the cathode. The water guide porous layer 633 also has a linear projection 635 along a side corresponding to the slot 84. The linear projection 635 has substantially the same height as that of the projections 564. In assembly of the fuel cell, the water guide porous layer 633 is fit in the recess 561 of the gas separator 525, and the linear projection 635 is in contact with the surface of the gas diffusion layer 22. The fuel cell structure in the modification of the fifth embodiment does not have the flow path blockage area 565 unlike the fourth embodiment. The end of the water guide porous layer 633 with the linear projection 635 has a gas outlet 678 to introduce the flow of the oxidizing gas into the oxidizing gas exhaust manifold of the slot 84. In this modified structure, the porous material of the gas outlet 678 allows the continuous migration of water through and from the water guide porous layer 633. This modified structure of the fifth embodiment ensures the similar advantage to that of the fourth embodiment.

In the fuel cell structure of the fifth embodiment, the first water guide element of guiding the water in the plane direction and the linear projection 665 of the porous material blocking the gas outlet are integrally formed as the flow path-forming porous layer 623. The first water guide element and the linear projection 665 may, however, be provided separately. The similar effect is expected as long as the porous material for at least partly blocking the gas outlet is connected with the first water guide element of guiding the water in the plane direction, for example, the flow path-forming porous layer, such as to allow the continuous migration of water.

In another possible modification, the first water guide element of guiding the water in the plane direction and the linear projection of the porous material blocking the gas outlet may have different average pore diameters. In the condition of the different average pore diameters between the first water guide element and the linear projection, the flow of the oxidizing gas in discharge from the gas outlet goes into a portion having the greater average pore diameter and the lower flow path resistance. This arrangement further increases the flow rate of the oxidizing gas at the discharge and strengthens the water pulling force on the surface of the porous material, thus enhancing the water discharge from the inner-unit cell oxidizing gas flow path. This effect is attained by the different average pore diameters between the first water guide element and the linear projection. The smaller average pore diameter in the first water guide element enhances the water retention power of the first water guide element and desirably improves the water discharge efficiency by the water guiding function of the first water guide element. In the structure that the porous material blocks the gas discharge end of the space formed by the grooves in the inner-unit cell oxidizing gas flow path like the fifth embodiment, the greater average pore diameter of the linear projection desirably decreases the pressure loss at the discharge of the oxidizing gas from the gas outlet. This saves the energy consumed for the supply of the oxidizing gas to the fuel cell and improves the energy efficiency.

Figure 16:
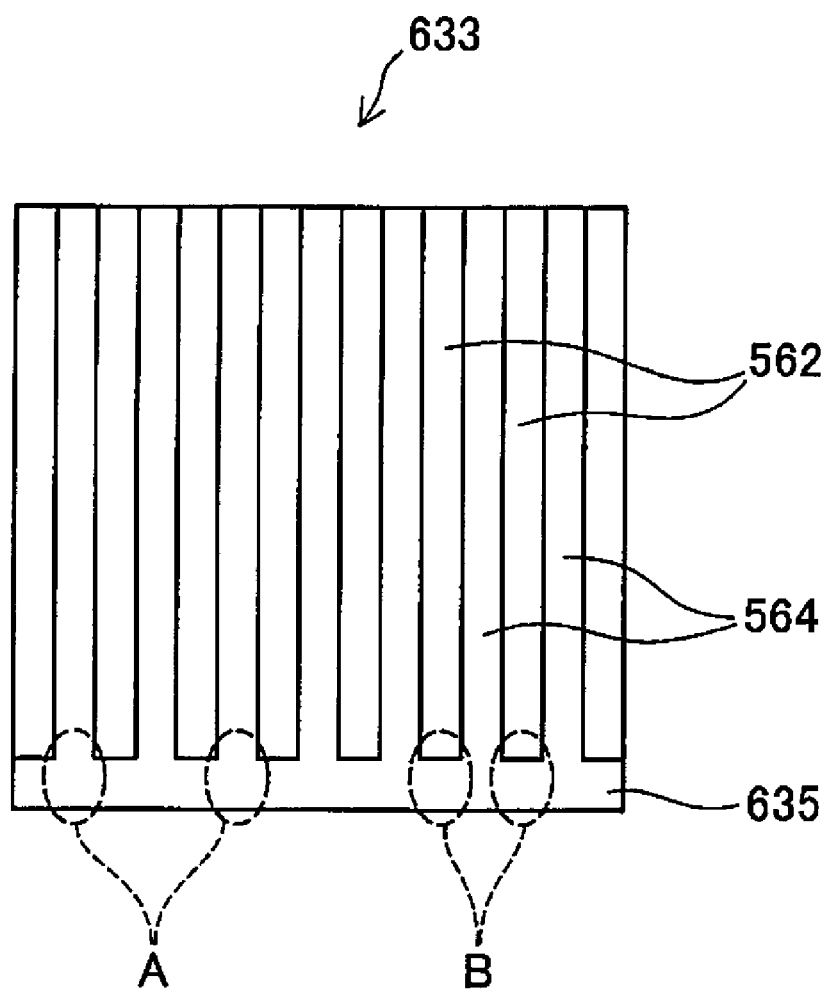
FIG. 16 is a plan view showing the structure of a water guide porous layer applicable to the modification of the fifth embodiment.

The linear projection of the porous material blocking the gas outlet may be divided into multiple sections having different average pore diameters. In this modified structure, the flow of the oxidizing gas in discharge from the gas outlet mainly goes into a portion having the greater average pore diameter and the lower flow path resistance. This arrangement further increases the flow rate of the oxidizing gas at the discharge, thus enhancing the water discharge from the inner-unit cell oxidizing gas flow path by utilizing the increased flow rate of the oxidizing gas. One example of this modified structure is shown in FIG. 16. FIG. 16 is a plan view showing the water guide porous layer 633 included in the fuel cell of the modification of the fifth embodiment shown in FIG. 14. The linear projection 635 provided on the water guide porous layer 633 has areas 'A' closer to the projections 564 and areas 'B' closer to the gas discharge ends of the grooves 562 as shown by the broken lines in FIG. 16. The areas 'A' and the areas 'B' of the linear projection 635 have different average pore diameters. For example, the average pore diameter in the areas 'A' may be set greater than the average pore diameter in the areas 'B'.

In the case of setting the different average pore diameters for the first water guide element and the linear projection or in the case of setting the different average pore diameters for the multiple sections of the linear projection as described above, porous bodies of different average diameters may be manufactured separately and assembled later to prepare the relevant member of the respective sites. When the relevant member is made of a foamed metal material, different foaming agents may be mixed with the foamed metal material in the respective sites to have different average pore diameters. When beads burnt down in a later firing step are mixed with the material, beads of different particle diameters may be used in the respective sites to have different average diameters.

G. Sixth Embodiment

Figure 17:
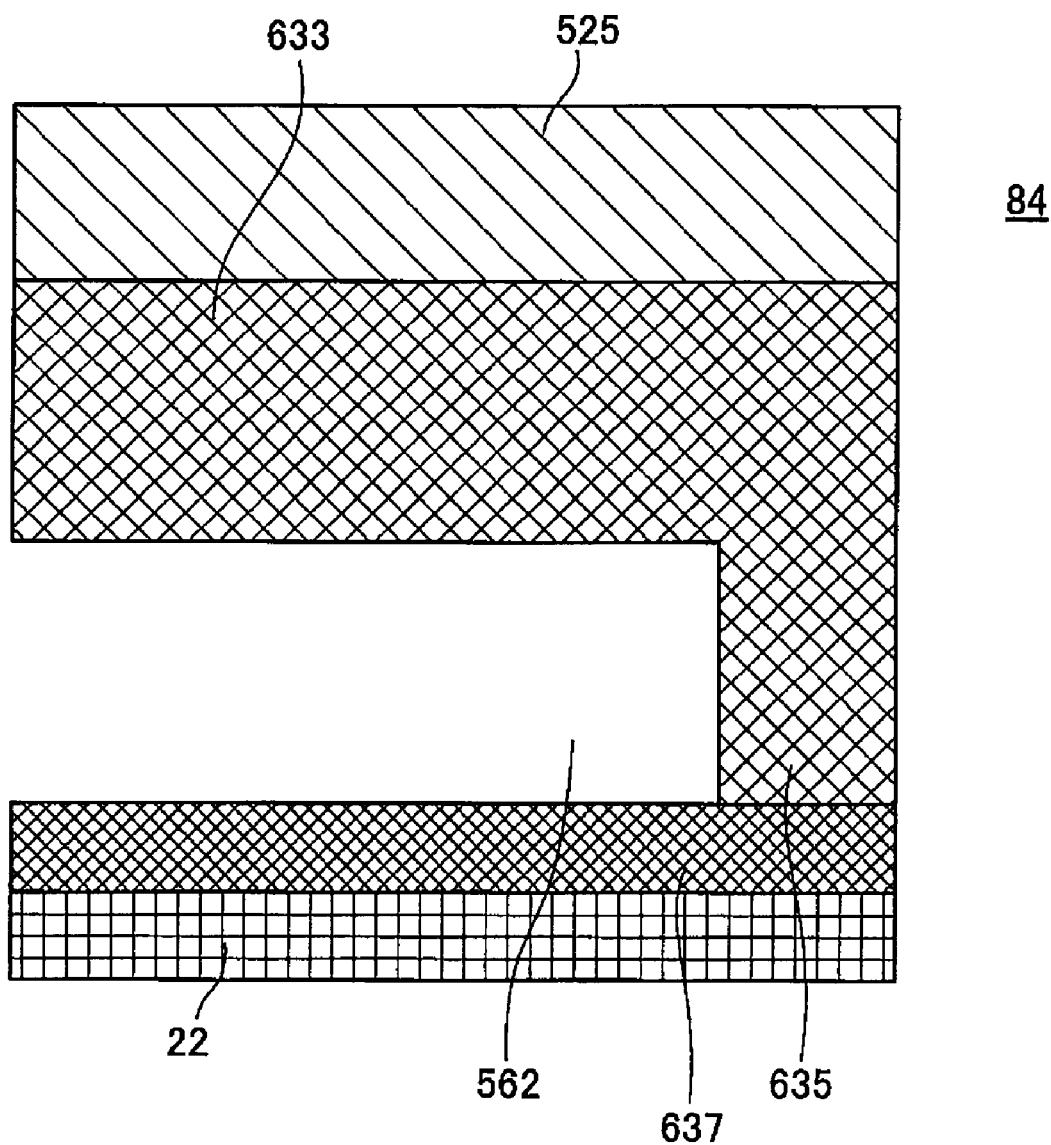
FIG. 17 is a sectional view showing the schematic structure of a fuel cell in a sixth embodiment.

In the fuel cell structures of the first through the fifth embodiments, the porous material for guiding the water in the electrode plane direction is used either for the porous layer that is in plane contact with the electrode or for the porous layer that is separate from the electrode but is in contact with the face of the gas separator. The fuel cell may have both these porous layers made of the porous material. This structure is described below as a sixth embodiment. The fuel cell of the sixth embodiment has the water guide porous layer 633 included in the fuel cell of the modification of the fifth embodiment shown in FIG. 14, as well as a flow path-forming porous layer 637, which is similar to the flow path-forming porous layer 23 of the first embodiment and is located to be in contact with the electrode plane (more precisely the gas diffusion layer 22). FIG. 17 shows the end of an inner unit-cell oxidizing gas flow path in the fuel cell of the sixth embodiment. The illustrated area of FIG. 17 corresponds to the structure of the first embodiment shown in FIG. 3. In the fuel cell of the sixth embodiment, the linear projection 635 and the projections 564 (not shown) on the water guide porous layer 633 are in contact with the flow path-forming porous layer 637.

In the fuel cell structure of the sixth embodiment, part of the water produced on the cathode is spread over the flow path-forming porous layer 637 and further migrates into the water guide porous layer 633 via the projections 564. The water is guided in the plane direction by means of both the flow path-forming porous layer 637 and the water guide porous layer 633. The gas discharge end of the inner-unit cell oxidizing gas flow path is covered with the porous material, that is, the linear projection 635 of the water guide porous layer 633 and the end of the flow path-forming porous layer 637. This structure increases the flow resistance of the oxidizing gas and thus encourages the water discharge on the flow of the oxidizing gas through the porous layers 633 and 637.

In the fuel cell structure of the sixth embodiment, the water present in the flow path-forming porous layer 637 migrates into the water guide porous layer 633. Compared with the fuel cell structure of the first embodiment having only the flow path-forming porous layer 23 located on the electrode, this structure of the sixth embodiment desirably reduces the content of water present between the electrode and the inner-unit cell oxidizing gas flow path. The reduced water content effectively facilitates the diffusion of the oxidizing gas to the electrode without the interference of water and thereby enhances the utilization efficiency of the oxidizing gas. The flow path-forming porous layer 637 located on the electrode enables immediate absorption of the water produced on the cathode. Compared with the fuel cell structure of the modification of the fifth embodiment having only the water guide porous layer 633, this structure of the sixth embodiment facilitates the diffusion of the oxidizing gas to the cathode without the interference of water and thereby enhances the utilization efficiency of the oxidizing gas.

Figure 18:
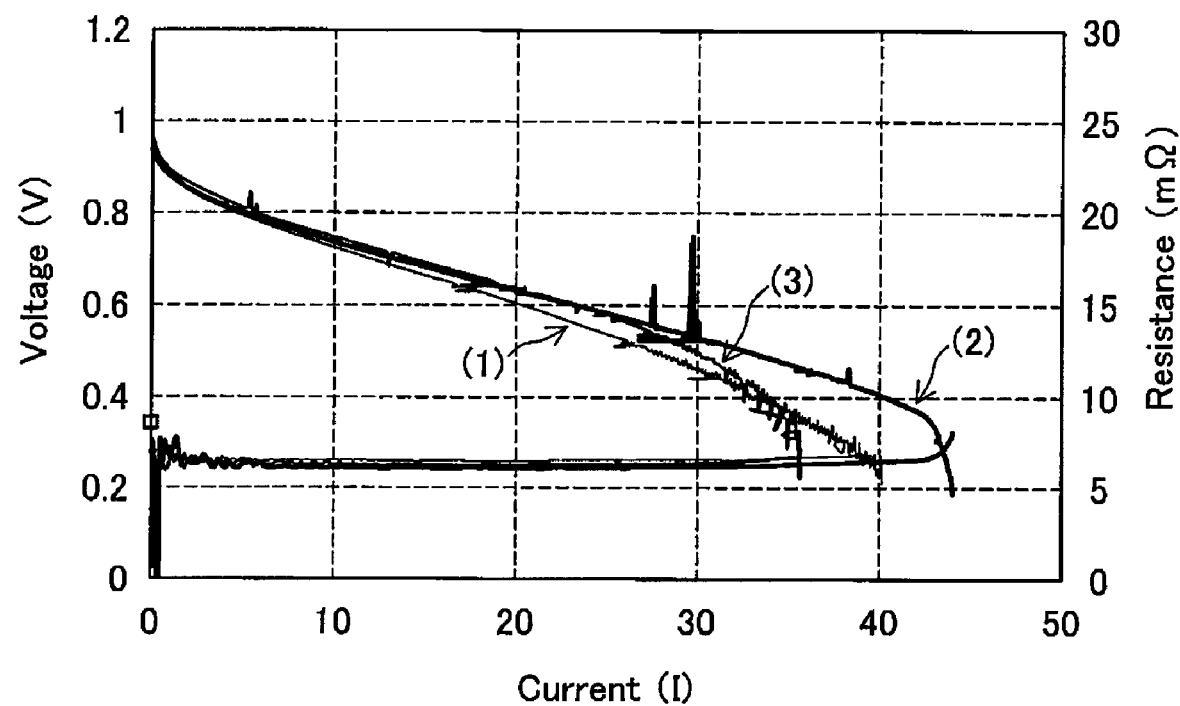
FIG. 18 is a graph showing the power generation performances of three fuel cells having different structures.

In the fuel cell structure of the sixth embodiment, it is desirable to make the thickness of the flow path-forming porous layer 637 less than the thickness of the water guide porous layer 633 extended along the surface of the gas separator 525. This arrangement enables the water guide porous layer 633 to retain a larger portion of the water produced on the cathode and thus effectively prevents the water present in the flow path-forming porous layer 637 from interfering with the diffusion of the oxidizing gas to the cathode. FIG. 18 is a graph showing the power generation performances of three fuel cells having different structures of the flow path-forming porous layer and the water guide porous layer. A curve (1) in FIG. 18 shows the power generation performance of the fuel cell in the modification of the fifth embodiment shown in FIGS. 14 and 15. Here the water guide porous layer 633 extended along the gas separator 525 has the thickness of 0.6 mm. A curve (2) in FIG. 18 shows the power generation performance of the fuel cell in the sixth embodiment where the water guide porous layer 633 extended along the gas separator 525 is designed to be thicker than the flow path-forming porous layer 637. Here the water guide porous layer 633 extended along the gas separator 525 has the thickness of 0.6 mm, and the flow path-forming porous layer 637 has the thickness of 0.3 mm. A curve (3) in FIG. 18 shows the power generation performance of the fuel cell in the sixth embodiment where the thickness of the water guide porous layer 633 extended along the gas separator 525 is equal to the thickness of the flow path-forming porous layer 637. Here the water guide porous layer 633 extended along the gas separator 525 and the flow path-forming porous layer 637 have the thickness of 0.5 mm.

In the experiment of measuring the power generation performance, the three unit cells having the above structures were subjected to power generation. The experimental condition kept the outlet temperature of the cooling medium at 80° C. and humidified the fuel gas (hydrogen) and the oxidizing gas (the air) to attain the saturated vapor pressure at 80° C. The output voltage and the resistance were measured when the output current was gradually changed with fixed large excesses of the hydrogen supply and the oxygen supply. As shown in the graph of FIG. 18, the curves (2) and (3) have the significantly higher voltage values than the curve (1) even in the higher output current range. This proves that the combined use of the flow path-forming porous layer 637 and the water guide porous layer 633 enables the immediate water migration from the gas diffusion layer 22 on the cathode and ensures the smooth flow of the oxidizing gas to the cathode. This improves the cell performance. As shown in the graph of FIG. 18, the curve (2) keeps the higher voltage level than the curve (1) in the higher output current range. This proves that the thicker water guide porous layer 633 than the flow path-forming porous layer 637 reduces the water content retained in the flow path-forming porous layer 637 located on the gas diffusion layer 22. This encourages the diffusion of the oxidizing gas to the cathode and improves the cell performance.

In the fuel cell structure of the sixth embodiment, it is preferable to make the average pore diameter of the porous material for the flow path-forming porous layer 637 greater than the average pore diameter of the porous material for the water guide porous layer 633. The greater average pore diameter of the flow path-forming porous layer 637 enhances the diffusion of the oxidizing gas from the inner-unit cell oxidizing gas flow path to the cathode via the flow path-forming porous layer 637. The liquid water tends to migrate into the porous material having the smaller average pore diameter.

The design of the water guide porous layer 633 to have the smaller average pore diameter desirably accelerates the migration of the water from the flow path-forming porous layer 637 to the water guide porous layer 633. This arrangement further encourages the diffusion of the oxidizing gas from the inner-unit cell oxidizing gas flow path to the cathode and improves the cell performance.

In the structure of the flow path-forming porous layer 637 and the water guide porous layer 633 having different average pore diameters, the flow of the oxidizing gas in discharge from the gas outlet goes into a portion having the greater average pore diameter and the lower flow path resistance. This arrangement increases the flow rate of the oxidizing gas in the portion having the greater average pore diameter and accordingly enhances the efficiency of water discharge by utilizing the flow of the oxidizing gas. The combination of the different average pore diameters of the porous materials is not restricted to this structure, but the effect of the improved water discharge efficiency may be attained by a different structure. The requirement is that the gas discharge end of the water guide porous layer 633 extended along the gas separator 525 and the gas discharge end of the flow path-forming porous layer 637 have different average pore diameters. The uneven distribution of the average pore diameter in the porous material covering the gas outlet increases the flow rate of the oxidizing gas that passes through the portion having the greater average pore diameter, and accordingly improves the efficiency of water discharge.

H. Seventh Embodiment

In the fuel cell structures of the first through the sixth embodiments having the first water guide element of guiding the water in the electrode plane direction in the inner-unit cell oxidizing gas flow path and the gas outlet having the enhanced flow path resistance, the changeover of the flow direction of the oxidizing gas enables adequate control of the water content inside the fuel cell. This arrangement is described below as a fuel cell system in a seventh embodiment.

Figure 19:
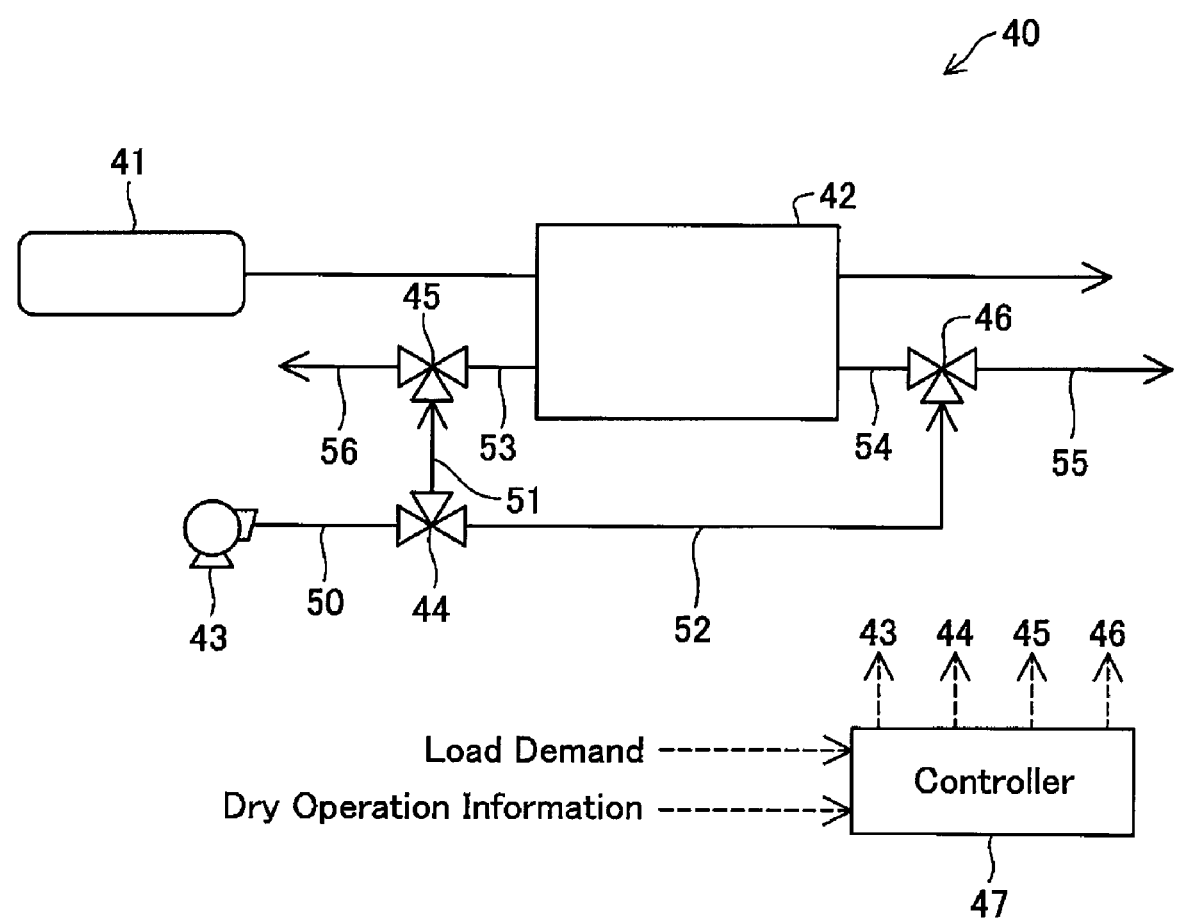
FIG. 19 is a block diagram showing the schematic structure of a fuel cell system in a seventh embodiment.

FIG. 19 is a block diagram showing the schematic structure of a fuel cell system 40 in the seventh embodiment. The fuel cell system 40 includes fuel cells 42, a hydrogen tank 41, a blower 43, and a controller 47. The fuel cells 42 may have any of the fuel cell structures described in the first through the sixth embodiments. The hydrogen tank 41 stores hydrogen gas and is connected via piping to the fuel gas supply manifold provided in the fuel cells 42 to supply the stored hydrogen as the fuel gas to the fuel cells 42. This embodiment is characteristic of the changeover structure of the oxidizing gas flow path, so that the structure of the fuel gas flow path is not specifically described here. The blower 43 takes in the air and supplies the intake air as the oxidizing gas to the fuel cells 42. The blower 43 is connected with an oxidizing gas flow path 50. The oxidizing gas flow path 50 branches off to two oxidizing gas flow paths 51 and 52 via a three-way valve 44. The oxidizing gas flow path 51 further diverges into two oxidizing gas flow paths 53 and 56 via a valve 45, whereas the oxidizing gas flow path further diverges into two oxidizing gas flow paths 54 and 55 via a valve 46. The oxidizing gas flow path 53 is connected to the oxidizing gas supply manifold provided in the fuel cells 42, and the oxidizing gas flow path 54 is connected to the oxidizing gas exhaust manifold provided in the fuel cells 42. The oxidizing gas flow paths 55 and 56 are open to the atmosphere.

The controller 47 is constructed as a microcomputer-based logic circuit and includes a CPU, a ROM, a RAM, and input and output ports for input and output of various signals. The controller 47 inputs various signals, for example, a load demand signal representing a load demand required for the fuel cells 42 and a signal on dry operation information (described below) and outputs driving signals to the blower 43 and the valves 44 to 46 in response to the input signals.

The dry operation information input into the controller 47 identifies whether the inside of the fuel cells 42 tends to be in a state of excess water content or tends to be in a state of insufficient water content. Typical examples of the dry operation information are the internal temperature of the fuel cells 42, the resistance (internal resistance) of the fuel cells 42, and the output voltage from the fuel cells 42. The internal temperature of the fuel cells 42 may be measured by a temperature sensor located inside the fuel cells 42 or located at any suitable position reflecting the internal temperature of the fuel cells 42, for example, in an oxidizing gas discharge flow path from the fuel cells 42. The internal resistance or the output voltage of the fuel cells 42 is detectable by an ammeter or a voltmeter located on a wiring connected to the fuel cells 42. The internal resistance may be specified by any suitable technique, for example, an alternating current impedance method.

When the input dry operation information shows the internal temperature of the fuel cells 42 to or below a preset reference temperature level, the internal resistance of the fuel cells 42 to or below a preset reference resistance level, or the output voltage of the fuel cells 42 over a preset reference voltage level, the CPU of the controller 47 identifies the inside of the fuel cells 42 tend to be in the state of excess water content (hereafter referred to as wet operation state). When the input dry operation information shows the internal temperature of the fuel cells 42 over the preset reference temperature level, the internal resistance of the fuel cell 42 over the preset reference resistance level, or the output voltage of the fuel cells 42 to or below the preset reference voltage level, on the other hand, the CPU of the controller 47 identifies the inside of the fuel cells 42 tend to be in the state of insufficient water content (hereafter referred to as dry operation state).

Upon identification of the wet operation state, the CPU of the controller 47 outputs driving signals to the valves 44 to 46 to set the flow direction of the oxidizing gas in the fuel cells 42 to the flow direction described in the first through the sixth embodiments. The control of the valves 44 to 46 blocks off the flow of the oxidizing gas into the oxidizing gas flow paths 52 and 56 and leads the flow of the oxidizing gas through the oxidizing gas flow paths 50, 51, and 53 into the oxidizing gas supply manifold provided in the fuel cells 42. The oxidizing gas is discharged from the oxidizing gas exhaust manifold provided in the fuel cells 42, is flowed through the oxidizing gas flow paths 54 and 55, and is released to the atmosphere.

Upon identification of the dry operation state, on the other hand, the CPU of the controller 47 outputs driving signals to the valves 44 to 46 to set the flow direction of the oxidizing gas in the fuel cells 42 to a reverse flow direction opposite to the flow direction described in the first through the sixth embodiments. The control of the valves 44 to 46 blocks off the flow of the oxidizing gas into the oxidizing gas flow paths 51 and 55 and leads the flow of the oxidizing gas through the oxidizing gas flow paths 50, 52, and 54 into the oxidizing gas exhaust manifold provided in the fuel cells 42. In this case, the oxidizing gas is discharged from the oxidizing gas supply manifold provided in the fuel cells 42, is flowed through the oxidizing gas flow paths 53 and 56, and is released to the atmosphere.

As described above, the fuel cell system 40 of the seventh embodiment includes the fuel cells having any of the fuel cell structures described in the first through the sixth embodiments. The changeover of the flow direction of the oxidizing gas in the fuel cells readily attains the adequate control of the water content inside the fuel cells. Upon identification of the wet operation state, the oxidizing gas is flowed in the fuel cells in the same direction as those described in the first through the sixth embodiments to accelerate the continuous water discharge from the inner-unit cell oxidizing gas flow path and thereby prevent the occurrence of a potential trouble caused by the excess water content. Upon identification of the dry operation state, on the other hand, the oxidizing gas is flowed in the fuel cells in the reverse direction opposite to those described in the first through the sixth embodiments to restrict the water discharge from the inner-unit cell oxidizing gas flow path. The reverse flow direction of the oxidizing gas in the inner-unit cell oxidizing gas flow path does not increase the flow resistance of the oxidizing gas discharged from the inner-unit cell oxidizing gas flow path and interferes with the water discharge from the porous body by means of the gas flow. This prevents the further progress of the dry state in the fuel cells. In this state, the gas outlet in the fuel cell structures of the first through the sixth embodiments is used as an inlet port of the oxidizing gas. The oxidizing gas flowing into the inner-unit cell oxidizing gas flow path passes through the porous body covering over the gas outlet. The inflow of the oxidizing gas is accordingly humidified with the water content included in the porous body. This further enhances the advantage of preventing the progress of the dry state in the fuel cells.

I. MODIFICATIONS

The embodiments and their modified examples discussed above are to be considered in all aspects as illustrative and not restrictive. There may be many other modifications, changes, and alterations without departing from the scope or spirit of the main characteristics of the present invention. Some examples of possible modification are given below.

I1. Modified Example 1

In the fuel cell structures of the first through the sixth embodiments, gold-plated titanium foam is used for the hydrophilic porous material of the first water guide element guiding the water in the electrode plane direction in the inner-unit cell oxidizing gas flow path. This material is, however, not restrictive, but another suitable porous material may be used for the same purpose. Coating the surface of a porous material (titanium in the above embodiments) with a certain material that has sufficient corrosion resistance in the internal environment of the fuel cell and the higher hydrophilicity (the lower contact angle) than the porous material gives the highly hydrophilic first water guide element. In another possible modification, a carbon porous material may replace the metal porous material adopted in the above embodiments. Acid treatment of the carbon porous material roughs the surface and introduces the hydrophilic hydroxyl group to yield the hydrophilic porous material, which is suitable for formation of the highly hydrophilic first water guide element. The carbon porous material may further be processed by plasma treatment. Surface treatment of the porous material to lower its contact angle to or below the contact angle of gold desirably gives the first water guide element of the sufficient hydrophilicity.

The desired properties of the hydrophilic porous material adopted for the first water guide element are capable of forming continuous water layers on the surface of inner pores and absorbing the water dropped on the surface of the porous body immediately or within 10 seconds at the latest. Under the condition of the saturated water content of the hydrophilic porous material for the first water guide element, the desired property of the hydrophilic porous material enables a water-absorbing material (for example, water-absorbing unwoven fabric) brought into contact with one end of the porous material to continuously absorb water droplet dropped at the other end of the porous material. The hydrophilic porous material is required to have the average pore diameter in a range of 0.1 to 200 μm or preferably in a range of 1 to 80 μm.

I2. Modified Example 2

The hydrophilic porous material adopted for the first water guide element of guiding the water in the electrode plane direction may not have a fixed pore diameter over the whole area but may have a varying pore diameter to have the smaller pore diameter in an area close to the gas outlet than the pore diameter in a residual area. This structure increases the flow resistance of the oxidizing gas in the vicinity of the gas outlet and accordingly strengthens the pulling force of the water continuously present on the surface of the pores. This structure also enhances the water retention power in the area close to the gas outlet higher than that in the residual area of the first water guide element and encourages migration of the water in the inner-unit cell oxidizing gas flow path toward the gas outlet. The encouraged water migration desirably improves the water discharge efficiency by the water guiding function of the first water guide element via the gas outlet. The porous material of the first water guide element is designed to have the smaller average pore diameter in only the area close to the gas outlet. This arrangement desirably restricts an increase in total pressure loss of the gas flow path, compared with the first water guide element having the smaller average pore diameter over the whole area. The restricted pressure loss effectively reduces the potential loss of auxiliary machinery used for supplying the oxidizing gas and prevents a significant decrease in system efficiency. This arrangement is especially preferable in the fuel cells driven in the wet operation state having the tendency of the excess water content inside the fuel cells and effectively prevents the occurrence of a potential trouble due to the presence of excess liquid water. The seventh embodiment described above regards the operation status changed between the wet operation state and the dry operation state during power generation of the fuel cells. In the wet operation state, the fuel cells tend to have the excess water content during power generation. The wet operation state arises, for example, in the operation of the fuel cells for power generation at a relatively low temperature level (for example, 60° C.).

When the fuel cells are driven in the dry operation state having the tendency of the insufficient water content inside the fuel cells, on the contrary, the hydrophilic porous material of the first water guide element may be designed to have the greater average pore diameter in the area close to the gas outlet than the average pore diameter in the residual area. This structure lowers the water retention power in the area close to the gas outlet than that in the residual area of the first water guide element and discourages migration of the water in the inner-unit cell oxidizing gas flow path toward the gas outlet. This structure also interferes with an increase in flow resistance of the oxidizing gas in the vicinity of the gas outlet and accordingly weakens the force of water discharge from the inner-unit cell oxidizing gas flow path by utilizing the flow of the oxidizing gas. This results in restriction of water discharge from the inner-unit cell oxidizing gas flow path. The dry operation state arises, for example, in the operation of the fuel cells with supply of the non-humidified reactive gas (fuel gas and/or oxidizing gas).

In the hydrophilic porous material of the first water guide element, the different average pore diameters adopted in the area close to the gas outlet and in the residual area effectively regulate the efficiency of continuous water discharge from the inner-unit cell oxidizing gas flow path by utilizing the flow of the oxidizing gas and thereby control the water content in the unit cell to an adequate level.

I3. Modified Example 3

The hydrophilic porous material of the first water guide element may be designed to have the higher surface hydrophilicity in the area close to the gas outlet than the surface hydrophilicity in the residual area. This structure improves the water retention capacity in the area close to the gas outlet and encourages the water discharge from the area close to the gas outlet, thus increasing the water discharge efficiency from the first water guide element. This arrangement is especially preferable in the fuel cells driven in the wet operation state and effectively prevents the occurrence of a potential trouble due to the presence of excess liquid water as described in modified example 2.

For example, the hydrophilicity or the surface wetting property of the carbon porous material may be varied by changing the hydrophilic process time (that is, by changing the number of OH groups). In the carbon porous material of the first water guide element, the hydrophilic process time is controlled to have the higher hydrophilicity in the area close to the gas outlet than the hydrophilicity in the residual area and to make a gradient of hydrophilicity increasing from the residual area to the area close to the gas outlet. This desirably enhances the water discharge efficiency from the first water guide element.

In the hydrophilic porous material of the first water guide element, the hydrophilicity in the area close to the gas outlet may be increased by adopting different surface roughnesses in the area close to the gas outlet and in the residual area. The surface roughness represents the minute concavo-convex state on the surface of the first water guide element. The higher surface roughness increases the hydrophilicity on the surface and enhances the water retention power of the porous body. For example, in application of the gold-plated titanium foam to the hydrophilic porous material of the first water guide element as described in the fuel cell structures of the first through the sixth embodiments, the conditions and the method of gold plating may be controlled to vary the minute concavo-convex state on the plated surface in the area. In another example, in application of the carbon porous material to the hydrophilic porous material of the first water guide element, the condition of the acid treatment performed on the carbon porous material as described in modified example 1, for example, the acid treatment time, may be controlled to vary the minute concavo-convex state on the surface of the porous material in the area. In still another example, a mechanical process may be used to physically leave tiny scratches on the surface of the hydrophilic porous material of the first water guide element. In this case, the degree of scratches left on the surface may be controlled to vary the minute concavo-convex state on the surface of the porous material in the area. Any of these techniques may be applied to attain the higher surface roughness in the area close to the gas outlet than the surface roughness in the residual area in the hydrophilic porous material of the first water guide element.

In the case of driving the fuel cells in the dry operation state as described in modified example 2, on the contrary, the hydrophilic porous material of the first water guide element may be designed to have the lower surface hydrophilicity in the area close to the gas outlet than the surface hydrophilicity in the residual area. For example, in the carbon porous material of the first water guide element, the hydrophilicity in the area close to the gas outlet of the first water guide element is relatively lowered by controlling the hydrophilic process time. The hydrophilic porous material of the first water guide element may alternatively be designed to have the lower surface roughness in the area close to the gas outlet than the surface roughness in the residual area. For example, in the carbon porous material of the first water guide element, the surface roughness in the area close to the gas outlet is relatively lowered by controlling the condition of the acid treatment. In the gold-plated titanium foam of the first water guide element, the surface roughness in the area close to the gas outlet is relatively lowered by controlling the conditions and the method of gold plating. In the porous material of the first water guide element, the surface roughness in the area close to the gas outlet is relatively lowered by controlling the degree of tiny scratches physically left on the surface. Any of these structures lowers the water retention power in the area close to the gas outlet than that in the residual area of the first water guide element and discourages migration of the water in the inner-unit cell oxidizing gas flow path toward the gas outlet. This results in restriction of water discharge from the inner-unit cell oxidizing gas flow path. This arrangement desirably prevents the occurrence of a potential trouble due to the insufficient water content inside the fuel cells that are driven in the dry operation state described in modified example 2.

I4. Modified Example 4

Figure 20:
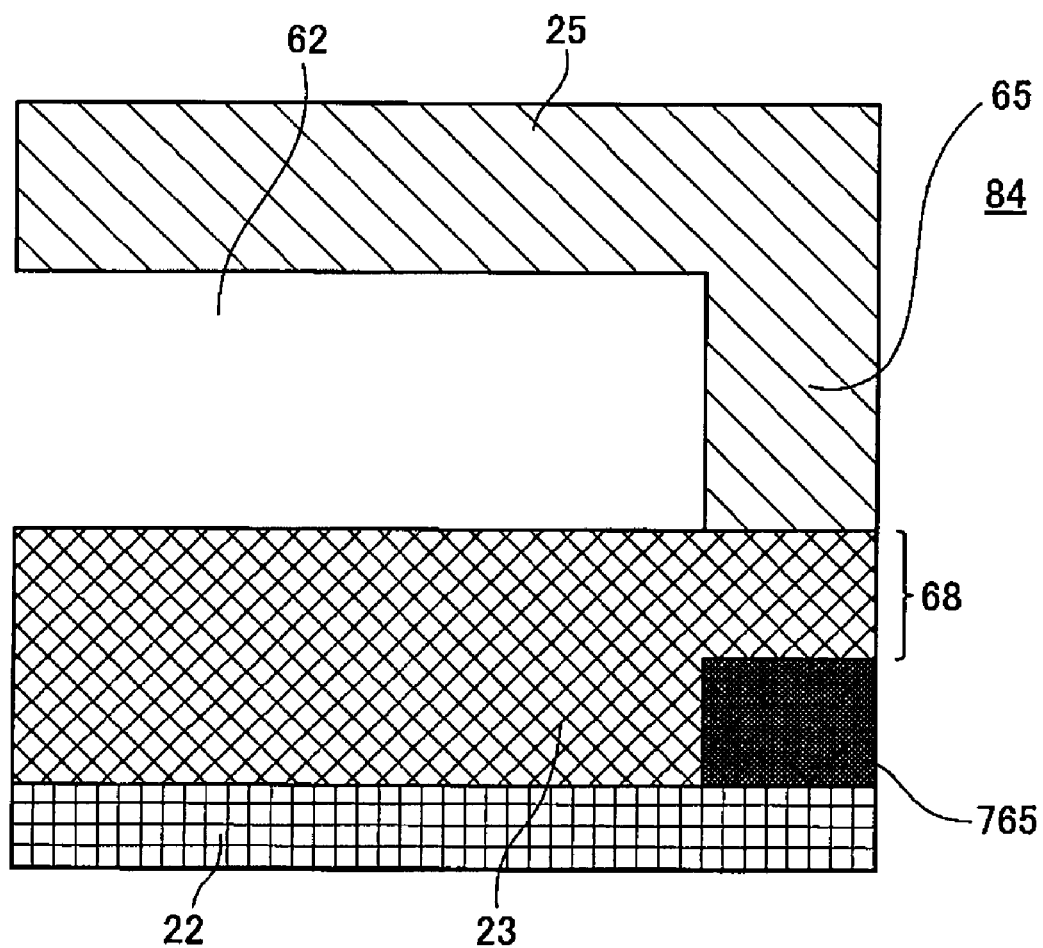
FIG. 20 is a sectional view showing the schematic structure of a fuel cell in modified example 4.

In the unit cell structure having the flow path blockage area to block the end of the space of the inner-unit cell oxidizing gas flow path and to lead the flow of the oxidizing gas in the vicinity of the gas outlet into the inside of the porous material of the first water guide element, part of the gas outlet end of the porous material may further be blocked. FIG. 20 is a sectional view showing the schematic structure of the end of the inner-unit cell oxidizing gas flow path in a fuel cell of modified example 4 having this additional blockage. The illustrated area of FIG. 20 corresponds to the structure of the first embodiment shown in FIG. 3. The like elements in the fuel cell of modified example 4 shown in FIG. 20 to those in the fuel cell of the first embodiment shown in FIG. 1 are expressed by the like numerals and are not specifically described here.

In the fuel cell structure of FIG. 20, the flow path-forming porous layer 23 additionally has an outlet restriction element 765 located at its end to cover a part of the gas outlet 68. The outlet restriction element 765 may be formed by filling the pores in the flow path-forming porous layer 23 with a polymer at part of the end of the flow path-forming porous layer 23. A typical example of the polymer used for filling the pores is polyethylene. Heated and molten polyethylene at the temperature of or over 120° C. is applied on the surface of the porous layer 23. The outlet restriction element 765 may alternatively be formed by covering part of the end of the flow path-forming porous layer 23 with a seal member located along the slot 84 for the oxidizing gas exhaust manifold. The partial blockage in the cross section of the gas outlet end of the porous material of the first water guide element further enhances the flow resistance of the oxidizing gas discharged from the inner-unit ell oxidizing gas flow path. This strengthens the pulling force of the water present in the porous material by the gas flow and thereby enhances the water discharge efficiency by utilizing the gas flow.

I5. Modified Example 5

In the fuel cell structures of the first through the sixth embodiments described above, the multiple substantially parallel grooves are provided on the surface of the gas separator, the flow path-forming porous layer, or the water guide porous layer to define the space of the inner-unit cell oxidizing gas flow path. The concave-convex structure is, however, not restricted to the multiple parallel grooves. Any other shape of the concave-convex structure may be applied to form a gas flow path connecting the oxidizing gas supply manifold with the oxidizing gas exhaust manifold. For example, the gas flow path of the oxidizing gas may have a curve or a bent to change the flow direction of the oxidizing gas, instead of the linear gas flow path. In another modified structure, multiple projections may be arranged at preset intervals on the surface of the gas separator, the flow path-forming porous layer, or the water guide porous layer to form the space of the inner-unit cell oxidizing gas flow path. Any of these modified structures attains the similar advantages to those of the embodiments described above, as long as the gas outlet is designed to be partly overlapped with the first water guide element and have the higher flow path resistance at the end of the inner-unit cell oxidizing gas flow path.

I6. Modified Example 6

In the fuel cell structures of the first through the sixth embodiments described above, the concave-convex structure including multiple projections and grooves is formed on the surface of the gas separator, the flow path-forming porous layer, or the water guide porous layer to ensure the space for the flow of the oxidizing gas other than the pores in the hydrophilic porous material. One or multiple expanded metal spacers may be used in place of the concave-convex structure to form the space for the flow of the oxidizing gas and enable current collection between the MEA 20 and the gas separator.

In one modified structure, a flat flow path-forming porous layer similar to the flow path-forming porous layer 23 of the first embodiment is combined with a gas separator having a flat-bottomed recess similar to the gas separator 224 of the second embodiment. One or multiple expanded metal spacers are arranged between the combination of the flat flow path-forming porous layer and the gas separator having the flat-bottomed recess. The mesh shape, the mesh size, and the number of the expanded metal spacers are adequately controlled to attain the effect of restricting the total pressure loss in the whole oxidizing gas flow path as in the fuel cell structure of the first embodiment described above. The expanded metal spacers also ensure the current collection capacity between the gas separator and the electrode.

In another modified structure, a flat water guide porous layer without the projections 564 is used, in place of the water guide porous layer 523 with the projections 564 that are fit in the recess 561 of the gas separator 525 in the fuel cell structure of the fourth embodiment. One or multiple expanded metal spacers are arranged between the flat water guide porous layer and the gas diffusion layer 22. In this case, the expanded metal spacers should be treated to have the higher hydrophilicity. For example, gold-plated titanium may be used for the expanded metal spacers. The mesh size of the expanded metal spacers is set to a sufficiently small value to enable uniform migration of water from the whole electrode surface. In this structure, the expanded metal spacers function as the second water guide element to migrate the water from the electrode toward the first water guide element of guiding the water in the electrode plane direction.

7. Modified Example 7

Figure 21:
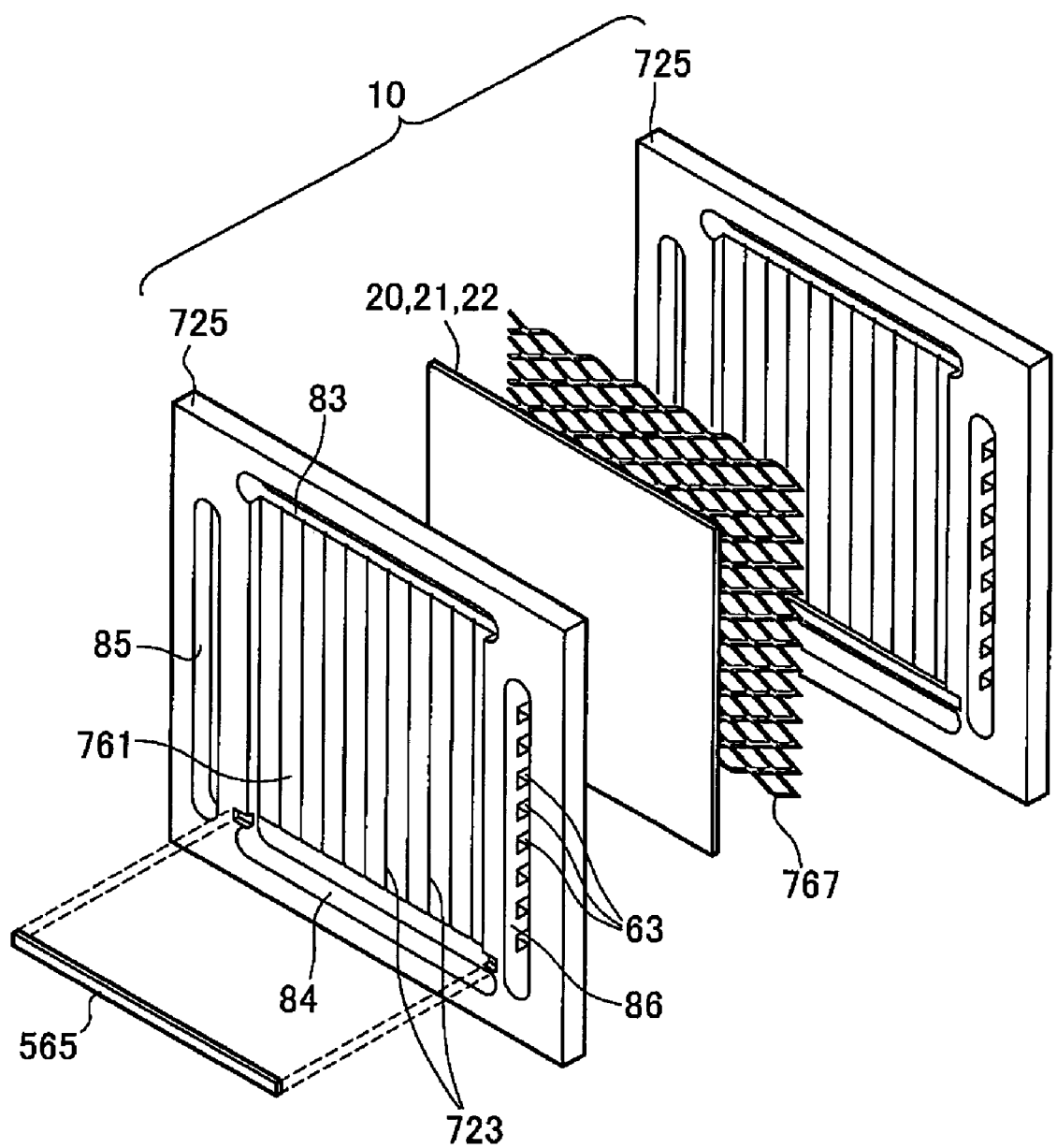
FIG. 21 is a decomposed perspective view illustrating the schematic structure of a fuel cell in modified example 7.

In the fuel cell structures of the first through the sixth embodiments, the hydrophilic porous material is used for the first water guide element of continuously guiding the water in the plane direction. The first water guide element is, however, not restricted to the hydrophilic porous material, but another structure may be applied for the first water guide element. FIG. 21 is a decomposed perspective view showing a fuel cell structure of modified example 7 having a first water guide element that is not made of the hydrophilic porous material. The like elements in the fuel cell structure of modified example 7 shown in FIG. 21 to those in the fuel cell structures of the above embodiments are expressed by the like numerals and are not specifically described here.

The fuel cell shown in FIG. 21 has a gas separator 725. The gas separator 725 has a similar structure to that of the gas separator 525 of the fourth embodiment shown in FIG. 10, except the flat-bottomed recess 561 replaced by a recess 761 having multiple substantially parallel grooves 723 formed to connect the slot 83 with the slot 84 over its whole bottom face. One or multiple expanded metal spacers 767 identical with those used in the fuel cell structure of modified example 5 are arranged between and in contact with the bottom face of the recess 761 and the gas diffusion layer 22. In the illustrated structure of FIG. 21, only one expanded metal spacer 767 is located between the bottom face of the recess 761 and the gas diffusion layer 22.

The hydrophilicity of the gas separator 725 is increased by surface treatment. One typical procedure of such surface treatment plates the surface of the gas separator 725 made of titanium with gold. The width of each groove 723 formed on the surface of the gas separator 725 is determined to enable continuous retention of water along the groove 723 by means of surface tension. The surface treatment for increasing the hydrophilicity may be performed not over the whole surface of the gas separator 725 but only on the surface of the grooves 723. A residual surface area of the gas separators 725 other than the grooves 723 is required to have sufficiently high corrosion resistance without sacrificing its electric conductivity. In the fuel cell structure of this modified example, the whole surface of the gas separator 725 is plated with gold, in order to increase the hydrophilicity in the surface area of the grooves 723 and increase the corrosion resistance without sacrificing the electric conductivity in the residual surface area. The hydrophilicity of the expanded metal spacer 767 is also increased by surface treatment. One typical procedure of such surface treatment plates the surface of the expanded metal spacer 767 made of titanium with gold.

Figure 22:
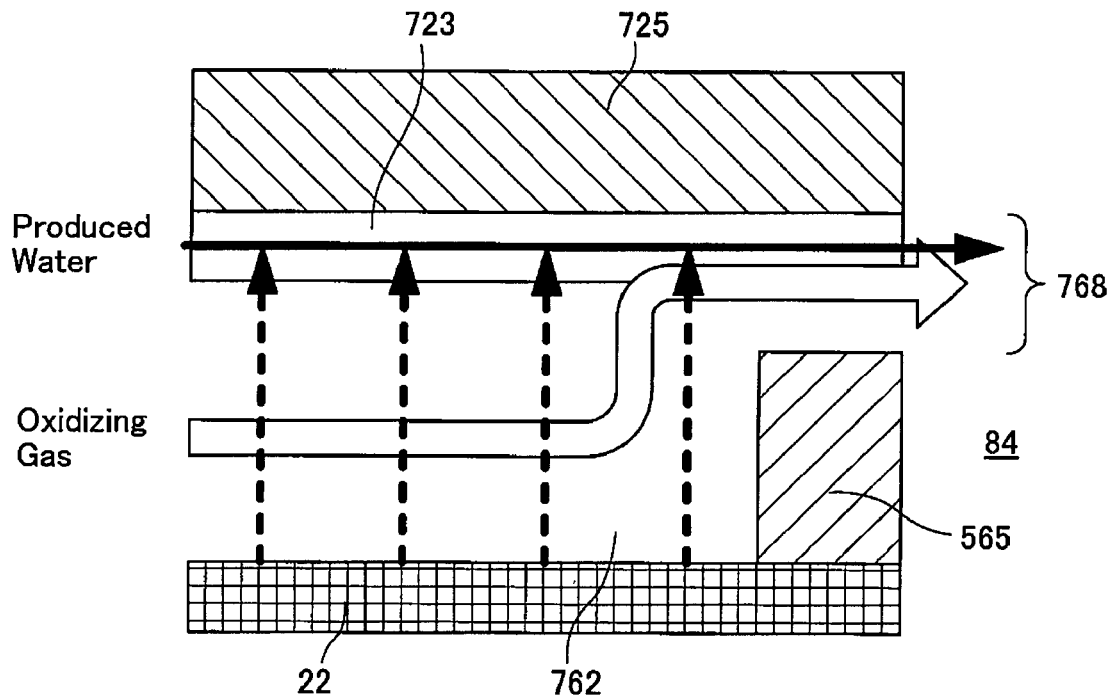
FIG. 22 is a sectional view showing the schematic structure of the fuel cell in modified example 7.

FIG. 22 is a sectional view schematically showing the flows of the oxidizing gas and water at one end of the inner-unit cell oxidizing gas flow path in the fuel cell of this modified example as in the sectional view of FIG. 3. The expanded metal spacer 767 located between the gas diffusion layer 22 and the gas separator 725 is omitted from the illustration of FIG. 22. During power generation of this fuel cell, water produced on the cathode flows along the surface of the expanded metal spacer 767 to the recess 761 of the gas separator 725 and is led into the grooves 723 formed on the bottom of the recess 761 to be spread along the grooves 723. The end of the inner-unit cell oxidizing gas flow path has the flow path blockage area 565 to narrow the flow path sectional area and increase the flow resistance of the gas and is partly open as a gas outlet 768. The gas outlet 768 is open to be partly overlapped with the end of the groove 723, so that the water is pulled by the flow of the oxidizing gas at an increased flow rate on the surface in the vicinity of the end of the groove 723 and is discharged with the flow of the oxidizing gas from the gas outlet 768.

In the fuel cell structure of this modified example, the multiple grooves 723 formed on the surface of the gas separator 725 work as the first water guide element of continuously guiding the water in the electrode plane direction. The expanded metal spacer 767 works as the second water guide element of migrating the water produced on the electrode toward the multiple grooves 723 as the first water guide element. As in the fuel cell structures of the above embodiments, the fuel cell structure of this modified example advantageously ensures the efficient continuous water discharge from the inner-unit cell oxidizing gas flow path by utilizing the flow rate of the oxidizing gas.

The fuel cell structure in modified example 7 may be combined with the fuel cell structure in the modified example of the third embodiment. The flow path blockage area 565 shown in FIG. 22 may have the opening regulator 467 of the water-absorbing material, which is provided in the flow path blockage area 365 shown in FIG. 9 as the modified example of the third embodiment. The opening size of the gas outlet 768 may be varied according to the water content in the gas flow path.

I8. Modified Example 8

In the fuel cell structure having the first water guide element of continuously guiding the water in the electrode plane direction, a gas inlet for inflow of the oxidizing gas into the inner-unit cell oxidizing gas flow path may be at least partly covered with a porous material. The porous material is desirably arranged to allow water migration to and from the first water guide element. This structure enables humidification of the oxidizing gas that passes through the porous material and flows into the inner-unit cell oxidizing gas flow path.

In this modified fuel cell structure, for example, a flow path-forming porous layer has a linear projection formed along a side corresponding to the slot 83 for the oxidizing gas supply, as in the linear projection 665 formed on the flow path-forming porous layer 623 in the fuel cell of the fifth embodiment shown in FIG. 12. A gas separator has a recess formed along the slot 83, as in the recess 666 formed along the slot 84 of the gas separator 625 in the fuel cell of the fifth embodiment shown in FIG. 12.

Figure 23:
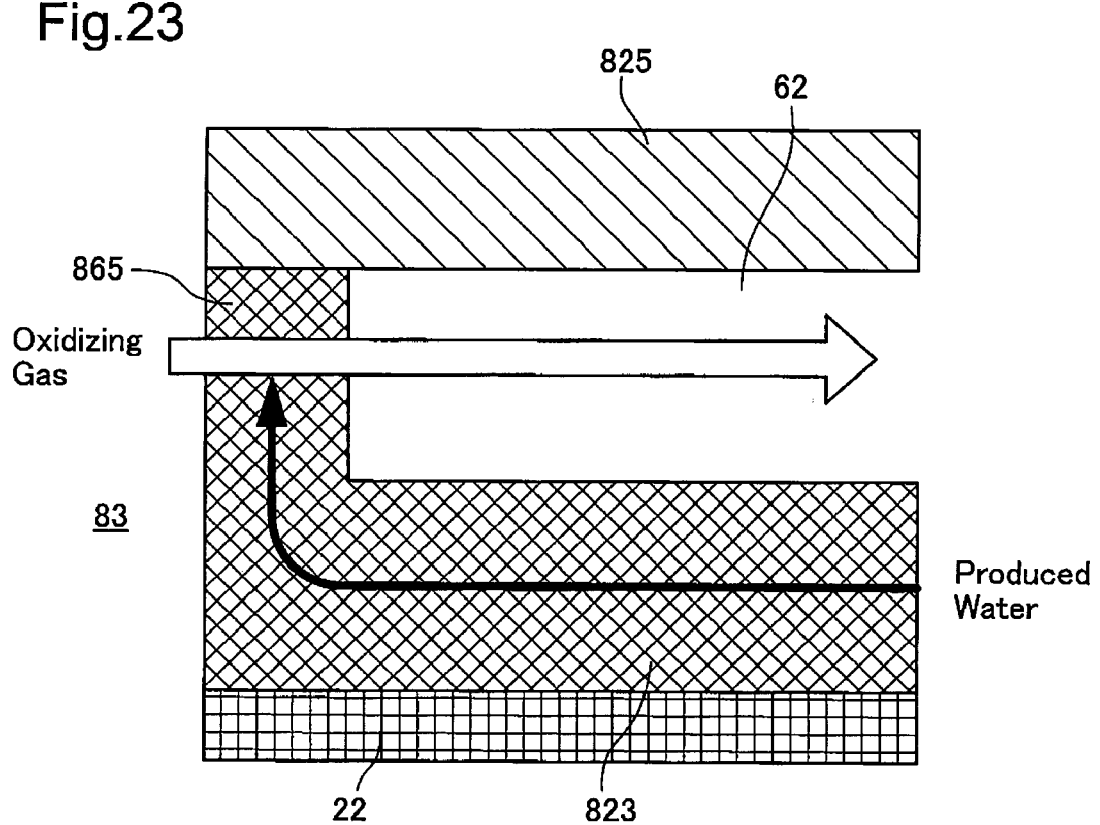
FIG. 23 is a sectional view showing the schematic structure of a fuel cell in modified example 8.

FIG. 23 is a sectional view schematically showing the flows of the oxidizing gas and water at one end of the inner-unit cell oxidizing gas flow path in the fuel cell of this modified example as in the sectional view of FIG. 3. The like elements in the fuel cell structure of modified example 8 shown in FIG. 23 to those in the fuel cell structures of the above embodiments are expressed by the like numerals and are not specifically described here. During power generation of this fuel cell, water produced on the cathode is guided along the surface of pores in a flow path-forming porous layer 823 made of gold-plated metal foam having the increased hydrophilicity and is spread in the electrode plane direction. The water spread in the flow path-forming porous layer 823 is also guided to a hydrophilic linear projection 865, which is integrally formed with the flow path-forming porous layer 823 and is arranged along the side corresponding to the slot 83. The water guided to the linear projection 865 accordingly humidifies the oxidizing gas, which is flowed from the slot 83 for the oxidizing gas supply manifold through the projection 865 into the inner-unit cell oxidizing gas flow path.

In the fuel cell structure of FIG. 23, the projection 865 is formed to cover over the whole gas inlet for inflow of the oxidizing gas into the inner-unit cell oxidizing gas flow path. Part of the end of the inner-unit cell oxidizing gas flow path formed by the groove 62 may alternatively be open to the oxidizing gas supply manifold. The projection 865 is integrally formed with the flow path-forming porous layer 823 functioning as the first water guide element in this modified example. The integral structure is, however, not essential. As long as a projection is designed to enable migration of water to and from a first water guide element, the projection may be provided separately from the first water guide element. In the fuel cell structure of FIG. 23, the projection 865 is provided on the flow path-forming porous layer that is included in the fuel cell structure of the fifth embodiment shown in FIG. 12. A similar porous body may be provided in any of the fuel cell structures of the other embodiments to receive the water guided by the first water guide element and humidify the oxidizing gas flowing into the inner-unit cell oxidizing gas flow path.

I9. Modified Example 9

In the fuel cell structures of the first through the seventh embodiments and modified examples 1 through 8 described above, the first water guide element located between the cathode and the gas separator to guide the water in the electrode plane direction is arranged to cover over the whole surface of the electrode. The first water guide element may alternatively be arranged to cover only a partial area on the electrode. For example, in the fuel cell structure of modified example 8 shown in FIG. 21, the grooves 723 provided as the first water guide element on the surface of the gas separator may be formed not over the whole area facing the electrode but in a half area closer to the slot 84 for the oxidizing gas exhaust manifold. The first water guide element may thus be provided in at least a partial area facing the electrode to guide the water in the electrode plane direction toward a gas outlet. This arrangement ensures the advantage of efficient discharge of the water migrated from the electrode into the first water guide element by utilizing the oxidizing gas flow.

I10. Modified Example 10

In the fuel cell structures of the embodiments, the inner-unit cell oxidizing gas flow path is provided with the first water guide element of guiding the water produced on the electrode in the electrode plane direction. The gas outlet open to be at least partly overlapped with the end of the first water guide element is designed to have the higher flow resistance of the oxidizing gas and thus enables continuous water discharge from the first water guide element. Water is produced by the electrochemical reaction proceeding on the cathode. The above arrangement for enhancing the water discharge efficiency is thus especially advantageous in the inner-unit cell oxidizing gas flow path. This structure may, however, be provided in the inner-unit cell fuel gas flow path in addition to or in place of the inner-unit cell oxidizing gas flow path. Namely at least one of the inner-unit cell oxidizing gas flow path and the inner-unit cell fuel gas flow path may be designed to have the above arrangement for enhancing the water discharge efficiency.

The following Japanese patent applications as the basis of the priority claim of this application are incorporated in the disclosure hereof by reference:

Japanese Patent Application No. 2006-327056 (filing date: Dec. 4, 2006); and

Japanese Patent Application No. 2007-298449 (filing date: Nov. 16, 2007).

What is claimed is:

1. A fuel cell, comprising:
an electrolyte layer;
an electrode formed on both sides of the electrolyte layer;
a gas diffusion layer provided on a respective electrode on each side of the electrolyte layer,
a gas separator that is laminated on the electrolyte layer and the electrode and forms, in combination with the electrode, a gas flow path to make a flow of a reactive gas that is subjected to an electrochemical reaction;
a first water guide element that is provided between the electrode and the gas separator and is arranged to enable migration of water from and to the electrode and to guide water in an electrode plane direction; and
a gas outlet that is open at one end of the gas flow path to be at least partly overlapped with one end of the first water guide element and discharges the flow of the reactive gas from the gas flow path, where the gas outlet is designed to have a higher flow resistance of the reactive gas than a flow resistance in the gas flow path,
wherein the gas outlet is formed at one end of the first water guide element and the end of the gas flow path adjacent the gas outlet is blocked, and
wherein the flow of the reactive gas is configured to be directed by the blocked end of the gas flow path from the gas flow path to the gas outlet through the water guide element.

2. The fuel cell in accordance with claim 1, wherein the first water guide element is arranged to cover over a whole surface of the electrode.

3. The fuel cell in accordance with claim 1, wherein the first water guide element includes a first porous body having pores continuously spread at least in the electrode plane direction to enable inflow of the reactive gas from the gas flow path.

4. The fuel cell in accordance with claim 3, wherein the end of the first porous body with the gas outlet has a partly blocked cross section.

5. The fuel cell in accordance with claim 3, wherein the gas outlet is open to part of a cross section of the gas flow path, in addition to the end of the first porous body.

6. The fuel cell in accordance with claim 3, wherein the first porous body is designed to have a smaller average pore diameter in an area close to the gas outlet than an average pore diameter in a residual area.

7. The fuel cell in accordance with claim 3, wherein the first porous body is designed to have a greater average pore diameter in an area close to the gas outlet than an average pore diameter in a residual area.

8. The fuel cell in accordance with claim 3, wherein the first porous body is designed to have a higher hydrophilicity in an area close to the gas outlet than a hydrophilicity in a residual area.

9. The fuel cell in accordance with claim 3, wherein the first porous body is designed to have a lower hydrophilicity in an area close to the gas outlet than a hydrophilicity in a residual area.

10. The fuel cell in accordance with claim 3, wherein the pores formed in the first porous body are spread continuously in a laminating direction as well as in the electrode plane direction, the first porous body is provided to be in contact with the electrode and to cover over a whole surface of the electrode, and the gas flow path is formed between the first porous body and the separator.

11. The fuel cell in accordance with claim 10, wherein one of the first porous body and the separator has multiple projections, the multiple projections are brought into contact with an opposed face of the other of the separator and the first porous body, and the gas flow path includes a space defined by the multiple projections.

12. The fuel cell in accordance with claim 3, wherein the first porous body is located on one plane of the separator for forming the gas flow path, and the gas flow path is formed between the electrode and the first porous body, the fuel cell further having:

a second water guide element that connects the electrode with the first porous body, such as to enable migration of water between the electrode and the first porous body.

13. The fuel cell in accordance with claim 12, wherein the first porous body has multiple projections that are in contact with an opposed face of the electrode, the gas flow path includes a space defined by the multiple projections, and the multiple projections work as the second water guide element.

14. The fuel cell in accordance with claim 12, the fuel cell further having:

a second porous body that is provided to be in contact with the electrode and cover over a whole surface of the electrode, wherein the gas flow path is formed between the first porous body and the second porous body, and the second water guide element is arranged to enable migration of water between the first porous body and the second porous body.

15. The fuel cell in accordance with claim 14, wherein the second porous body has a lower thickness than the first porous body.

16. The fuel cell in accordance with claim 14, wherein the second porous body has a greater average pore diameter than the first porous body.

17. The fuel cell in accordance with claim 3, wherein the first porous body has a base porous material that is subjected to surface treatment to have a contact angle of or below a contact angle of gold.

18. The fuel cell in accordance with claim 1, wherein the first water guide element has multiple grooves formed on one face of the separator for forming the gas flow path, and the gas outlet is formed to be continuous with the first water guide element and is open to part of a cross section of the gas flow path, the fuel cell further having:

a second water guide element that connects the electrode with the first water guide element, such as to enable migration of water between the electrode and the first water guide element.

19. The fuel cell in accordance with claim 5, wherein the gas outlet has a water-absorbing material that is provided in part of an open wall surface and absorbs water to be swollen and releases water to be contracted.

20. The fuel cell in accordance with claim 1, wherein the gas outlet has a specific area that is open at the end of the first water guide element and a residual area covered with a second porous body, which is arranged to enable migration of water to and from the first water guide element.

21. The fuel cell in accordance with claim 20, wherein the first water guide element includes a first porous body having pores continuously spread at least in the electrode plane direction to enable inflow of the reactive gas from the gas flow path, and the first porous body and the second porous body have different average pore diameters.

22. The fuel cell in accordance with claim 20, wherein the second porous body includes plural divisional sections having different average pore diameters.

23. The fuel cell in accordance with claim 1, the fuel cell further having:

a third porous body that is provided at one end of the first water guide element to enable migration of water to and from the first water guide element and is arranged to cover over at least part of a gas inlet for inflow of the reactive gas into the gas flow path.

24. The fuel cell in accordance with claim 1, wherein the first water guide element is treated by a hydrophilic process.

25. The fuel cell in accordance with claim 24, wherein the electrode further has a gas diffusion layer treated by a water repellent process.

* * * * *